United States Patent
Palacios Rodríguez et al.

(10) Patent No.: US 11,682,883 B2
(45) Date of Patent: Jun. 20, 2023

(54) POWER DISTRIBUTION SYSTEM AND METHOD

(71) Applicant: SCHNEIDER ELECTRIC IT CORPORATION, Foxboro, MA (US)

(72) Inventors: Jorge Humberto Palacios Rodríguez, Apodaca (MX); Victor Daniel Espinosa Gutierrez, Apodaca (MX)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 92 days.

(21) Appl. No.: 17/462,099

(22) Filed: Aug. 31, 2021

(65) Prior Publication Data
US 2023/0060944 A1  Mar. 2, 2023

(51) Int. Cl.
*H02B 1/04* (2006.01)
*H02B 3/00* (2006.01)

(52) U.S. Cl.
CPC .............. *H02B 1/04* (2013.01); *H02B 3/00* (2013.01)

(58) Field of Classification Search
CPC .................................... H02B 1/04; H02B 3/00
See application file for complete search history.

(56) References Cited

U.S. PATENT DOCUMENTS

| | | | | |
|---|---|---|---|---|
| 2,169,860 A | * | 8/1939 | Von Hoorn | H01H 9/282 200/43.15 |
| 4,491,896 A | * | 1/1985 | Rickmann | H02B 11/133 361/608 |
| 4,978,816 A | * | 12/1990 | Castonguay | H01H 9/282 200/43.14 |
| 5,060,107 A | * | 10/1991 | Castonguay | H01H 9/287 200/321 |
| 5,642,256 A | | 6/1997 | Pugh et al. | |

(Continued)

FOREIGN PATENT DOCUMENTS

| | | | |
|---|---|---|---|
| CN | 215183804 U | * 12/2021 | |
| JP | H10247447 A | * 9/1998 | ............. H01H 9/281 |

(Continued)

OTHER PUBLICATIONS

Extended European Search Report from corresponding European Application No. 22191846.9 dated Jan. 26, 2023.

*Primary Examiner* — Robert J Hoffberg
(74) *Attorney, Agent, or Firm* — Lando & Anastasi, LLP

(57) ABSTRACT

A power distribution system is releasably secured to a power distribution panel, and includes a circuit breaker to detect a fault condition and to automatically move a circuit breaker switch from the ON position to the OFF position. The power distribution system further includes a backplane connector to provide connection to the power distribution panel and an interconnect mechanism to connect the circuit breaker to the backplane connector when the circuit breaker is moved from a disengaged position to an engaged position with respect to the backplane connector. The power distribution system further includes a guard coupled to the interconnect mechanism and configured to cover portions of the enclosure of the circuit breaker. The guard further prevents the circuit breaker switch from moving from the OFF position to the ON position until the interconnect mechanism connects to the circuit breaker to the backplane connector.

30 Claims, 30 Drawing Sheets

(56) References Cited

U.S. PATENT DOCUMENTS

| | | | | |
|---|---|---|---|---|
| 7,446,270 B2* | 11/2008 | Somalingayya | ....... | H01H 9/286 |
| | | | | 200/50.33 |
| 9,805,881 B2* | 10/2017 | Richards | ................ | H01H 9/22 |
| 2010/0020475 A1 | 1/2010 | Spitaels et al. | | |

FOREIGN PATENT DOCUMENTS

| | | | | |
|---|---|---|---|---|
| JP | 2012186182 A | * | 9/2012 | |
| WO | 2015047307 A1 | | 4/2015 | |
| WO | WO-2016181244 A1 | * | 11/2016 | ............... H01H 9/28 |

* cited by examiner

POWER DISTRIBUTION SYSTEM AND METHOD

BACKGROUND OF DISCLOSURE

1. Field of Disclosure

Aspects of the present disclosure relate generally to data centers, including microdata centers, small rooms and closets, that contain racks and enclosures used to house data processing, power, networking and telecommunications equipment.

2. Discussion of Related Art

Equipment enclosures or racks for housing electronic equipment, such as data processing, power, networking and telecommunications equipment have been used for many years. Such racks are used to contain and to arrange the equipment in small wiring closets, microdata centers, small rooms, as well as equipment rooms and large data centers. An equipment rack can be an open configuration and can be housed within a rack enclosure, although the enclosure may be included when referring to a rack.

Power distribution systems include power distribution modules that are used with power distribution panels. Safety concerns exist with installing and removing power distribution modules when a circuit breaker associated with the power distribution system is in an ON position.

SUMMARY OF DISCLOSURE

One aspect of the present disclosure is directed to a power distribution system configured to be releasably secured to a power distribution panel. In one embodiment, the power distribution system comprises a circuit breaker including an enclosure configured to support at least one circuit breaker switch movable between an ON position and an OFF position. The circuit breaker is configured to detect a fault condition in which the circuit breaker further is configured to automatically move the at least one circuit breaker switch from the ON position to the OFF position. The power distribution system further comprises a backplane connector configured to provide connection to the power distribution panel and an interconnect mechanism configured to connect the circuit breaker to the backplane connector when the circuit breaker is moved from a disengaged position to an engaged position with respect to the backplane connector. The power distribution system further comprises a guard coupled to the interconnect mechanism and configured to cover portions of the enclosure of the circuit breaker. The guard further is configured to prevent the at least one circuit breaker switch from moving from the OFF position to the ON position until the interconnect mechanism connects to the circuit breaker to the backplane connector.

Embodiments of the power distribution system further may include configuring the guard with at least one feature to retain the guard in a first position to prevent movement of the circuit breaker to the ON position and to permit movement of the guard to a second position to enable movement of the circuit breaker from the OFF position to the ON position. The at least one feature may engage a rail to retain the guard in the first position when the circuit breaker is in the disengaged position with respect to the backplane connector to prohibit movement of the at least one circuit breaker switch to the ON position and may disengage the rail when the circuit breaker is in the engaged position with respect to the backplane connector to permit the guard to move to the second position to enable movement of the at least one circuit breaker switch to the ON position. The guard may include a front panel and at least one side element terminating in the at least one feature. The front panel may be configured to prevent the at least one circuit breaker switch from moving from the OFF position to the ON position. The guard further may include a first side element extending from the front panel along a first side of the enclosure of the circuit breaker and a second side element extending from the front panel along a second side of the enclosure of the circuit breaker. The guard further may include a first feature provided at an end of the first side element and a second feature provided at an end of the second side element. A spring is provided to bias the guard to the second position. The interconnect mechanism may include a locking assembly coupled to the guard. The locking assembly may be configured to secure the circuit breaker in the engaged position. The locking assembly may include a cylindrical barrel having a slot formed therein and a piston having a pin. The piston may be received in the cylindrical barrel with the pin being received in the slot. The pin may be configured to move from a retracted position to an extended position by rotating the cylindrical barrel. The cylindrical barrel may include a tool slot configured to receive a tool to rotate the cylindrical barrel. The tool slot may have a unique shape and the tool has a mating unique shape configured to be received by the tool slot. The backplane connector may include an adjustable connector assembly configured to adjust a backplane connector. The adjustable connector assembly may include a lever biased to engage an opening in a rail to maintain the backplane connector in a use position.

Another aspect of the present disclosure may be directed to a method of assembling a power distribution system. In one embodiment, the method comprises: positioning a backplane connector on a rail of a power distribution panel, the backplane connector being configured to provide connection to the power distribution panel; coupling a circuit breaker to the backplane connector by an interconnect mechanism, the circuit breaker including an enclosure configured to support at least one circuit breaker switch movable between an ON position and an OFF position, the circuit breaker being configured to detect a fault condition in which the circuit breaker further is configured to automatically move the at least one circuit breaker switch from the ON position to the OFF position, the interconnect mechanism being configured to connect the circuit breaker to the backplane connector when the circuit breaker is moved from a disengaged position to an engaged position with respect to the backplane connector; and coupling a guard to the interconnect mechanism, the guard being configured to cover portions of the enclosure of the circuit breaker, the guard further being configured to prevent the at least one circuit breaker switch from moving from the OFF position to the ON position until the interconnect mechanism connects to the circuit breaker to the backplane connector.

Embodiments of the method further may include retaining the guard in a first position to prevent movement of the circuit breaker to the ON position and to permit movement of the guard to a second position to enable movement of the circuit breaker from the OFF position to the ON position. The guard may include at least one feature to retain the guard in a first position and to permit movement of the guard to a second position. The at least one feature may engage the rail to retain the guard in the first position when the circuit breaker is in the disengaged position with respect to the backplane connector to prohibit movement of the at least one circuit breaker switch to the ON position and may disengage the rail when the circuit breaker is in the engaged position with respect to the backplane connector to permit the guard to move to the second position to enable movement of the at least one circuit breaker switch to the ON position. The guard may include a front panel and at least one side element terminating in the at least one feature. The front panel may be configured to prevent the at least one circuit breaker switch from moving from the OFF position to the ON position. The guard further may include a first side element extending from the front panel along a first side of the enclosure of the circuit breaker and a second side element extending from the front panel along a second side of the enclosure of the circuit breaker. The guard further may include a first feature provided at an end of the first side element and a second feature provided at an end of the second side element. The method further may include biasing the guard to the second position. The guard may be biased to the second position by a spring. Coupling the circuit breaker to the backplane connector by the interconnect mechanism may include coupling a locking assembly to the guard. The locking assembly may be configured to secure the circuit breaker in the engaged position. The locking assembly may include a cylindrical barrel having a slot formed therein and a piston having a pin, the piston being received in the cylindrical barrel with the pin being received in the slot. The pin may be configured to move from a retracted position to an extended position by rotating the cylindrical barrel. The cylindrical barrel may include a tool slot configured to receive a tool to rotate the cylindrical barrel. The tool slot may have a unique shape and the tool has a mating unique shape configured to be received by the tool slot. The backplane connector may include an adjustable connector assembly configured to adjust a backplane connector. The adjustable connector assembly may include a lever biased to engage an opening in the rail to maintain the backplane connector in a use position.

Yet another aspect of the present disclosure is directed to a power distribution system configured to be releasably secured to a power distribution panel. In one embodiment, the power distribution system comprises a circuit breaker including an enclosure configured to support at least one circuit breaker switch movable between an ON position and an OFF position. The circuit breaker is configured to detect a fault condition in which the circuit breaker further is configured to automatically move the at least one circuit breaker switch from the ON position to the OFF position. The power distribution system further comprises a backplane connector configured to provide connection to the power distribution panel and an interconnect mechanism configured to connect the circuit breaker to the backplane connector when the circuit breaker is moved from a disengaged position to an engaged position with respect to the backplane connector. The interconnect mechanism includes a locking assembly coupled to the backplane connector.

Embodiments of the power distribution system further may include configuring the locking assembly to secure the circuit breaker in the engaged position. The locking assembly my include a cylindrical barrel having a slot formed therein and a piston having a pin. The piston may be received in the cylindrical barrel with the pin being received in the slot. The pin may be configured to move from a retracted position to an extended position by rotating the cylindrical barrel. The cylindrical barrel may include a tool slot configured to receive a tool to rotate the cylindrical barrel. The tool slot may have a unique shape and the tool has a mating unique shape configured to be received by the tool slot. The backplane connector may include an adjustable connector assembly configured to adjust a backplane connector. The adjustable connector assembly may include a lever biased to engage an opening in a rail to maintain the backplane connector in a use position. The power distribution system further may include a guard coupled to the interconnect mechanism and configured to cover portions of the enclosure of the circuit breaker. The guard further may be configured to prevent the at least one circuit breaker switch from moving from the OFF position to the ON position until the interconnect mechanism connects to the circuit breaker to the backplane connector. The guard may include at least one feature configured to retain the guard in a first position to prevent movement of the circuit breaker to the ON position and to permit movement of the guard to a second position to enable movement of the circuit breaker from the OFF position to the ON position. The at least one feature may engage a rail to retain the guard in the first position when the circuit breaker is in the disengaged position with respect to the backplane connector to prohibit movement of the at least one circuit breaker switch to the ON position and may disengage the rail when the circuit breaker is in the engaged position with respect to the backplane connector to permit the guard to move to the second position to enable movement of the at least one circuit breaker switch to the ON position. The guard may include a front panel and at least one side element terminating in the at least one feature. The front panel may be configured to prevent the at least one circuit breaker switch from moving from the OFF position to the ON position. The guard further may include a first side element extending from the front panel along a first side of the enclosure of the circuit breaker and a second side element extending from the front panel along a second side of the enclosure of the circuit breaker. The guard further may include a first feature provided at an end of the first side element and a second feature provided at an end of the second side element. A spring is provided to bias the guard to the second position.

Another aspect of the present disclosure is directed to a power distribution system configured to be releasably secured to a power distribution panel. In one embodiment, the power distribution system comprises a circuit breaker including an enclosure configured to support at least one circuit breaker switch movable between an ON position and an OFF position. The circuit breaker may be configured to detect a fault condition in which the circuit breaker further is configured to automatically move the at least one circuit breaker switch from the ON position to the OFF position. The power distribution system further includes a backplane connector configured to provide connection to the power distribution panel and an interconnect mechanism configured to connect the circuit breaker to the backplane connector when the circuit breaker is moved from a disengaged position to an engaged position with respect to the backplane connector. The backplane connector includes an adjustable connector assembly configured to adjust a backplane connector.

Embodiments of the power distribution system further may include configuring the adjustable connector assembly with a lever biased to engage an opening in a rail to maintain the backplane connector in a use position. The power distribution system further may include a guard coupled to the interconnect mechanism and configured to cover portions of the enclosure of the circuit breaker, the guard further being configured to prevent the at least one circuit breaker switch from moving from the OFF position to the ON position until the interconnect mechanism connects to the circuit breaker to the backplane connector. The guard may include at least one feature configured to retain the guard in a first position to prevent movement of the circuit breaker to the ON position and to permit movement of the guard to a second position to enable movement of the circuit breaker from the OFF position to the ON position. The at least one feature may engage a rail to retain the guard in the first position when the circuit breaker is in the disengaged position with respect to the backplane connector to prohibit movement of the at least one circuit breaker switch to the ON position and may disengage the rail when the circuit breaker is in the engaged position with respect to the backplane connector to permit the guard to move to the second position to enable movement of the at least one circuit breaker switch to the ON position. The guard may include a front panel and at least one side element terminating in the at least one feature. The front panel may be configured to prevent the at least one circuit breaker switch from moving from the OFF position to the ON position. The guard further may include a first side element extending from the front panel along a first side of the enclosure of the circuit breaker and a second side element extending from the front panel along a second side of the enclosure of the circuit breaker. The guard further may include a first feature provided at an end of the first side element and a second feature provided at an end of the second side element. A spring is provided to bias the guard to the second position. The interconnect mechanism may include a locking assembly coupled to the guard. The locking assembly may be configured to secure the circuit breaker in the engaged position. The locking assembly may include a cylindrical barrel having a slot formed therein and a piston having a pin. The piston may be received in the cylindrical barrel with the pin being received in the slot. The pin may be configured to move from a retracted position to an extended position by rotating the cylindrical barrel. The cylindrical barrel may include a tool slot configured to receive a tool to rotate the cylindrical barrel. The tool slot may have a unique shape and the tool has a mating unique shape configured to be received by the tool slot.

BRIEF DESCRIPTION OF DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the disclosure. In the figures, identical or nearly identical components illustrated in various figures may be represented by like numerals. For purposes of clarity, not every component may be labeled in every figure. In the drawings.

DETAILED DESCRIPTION

Figure 1:
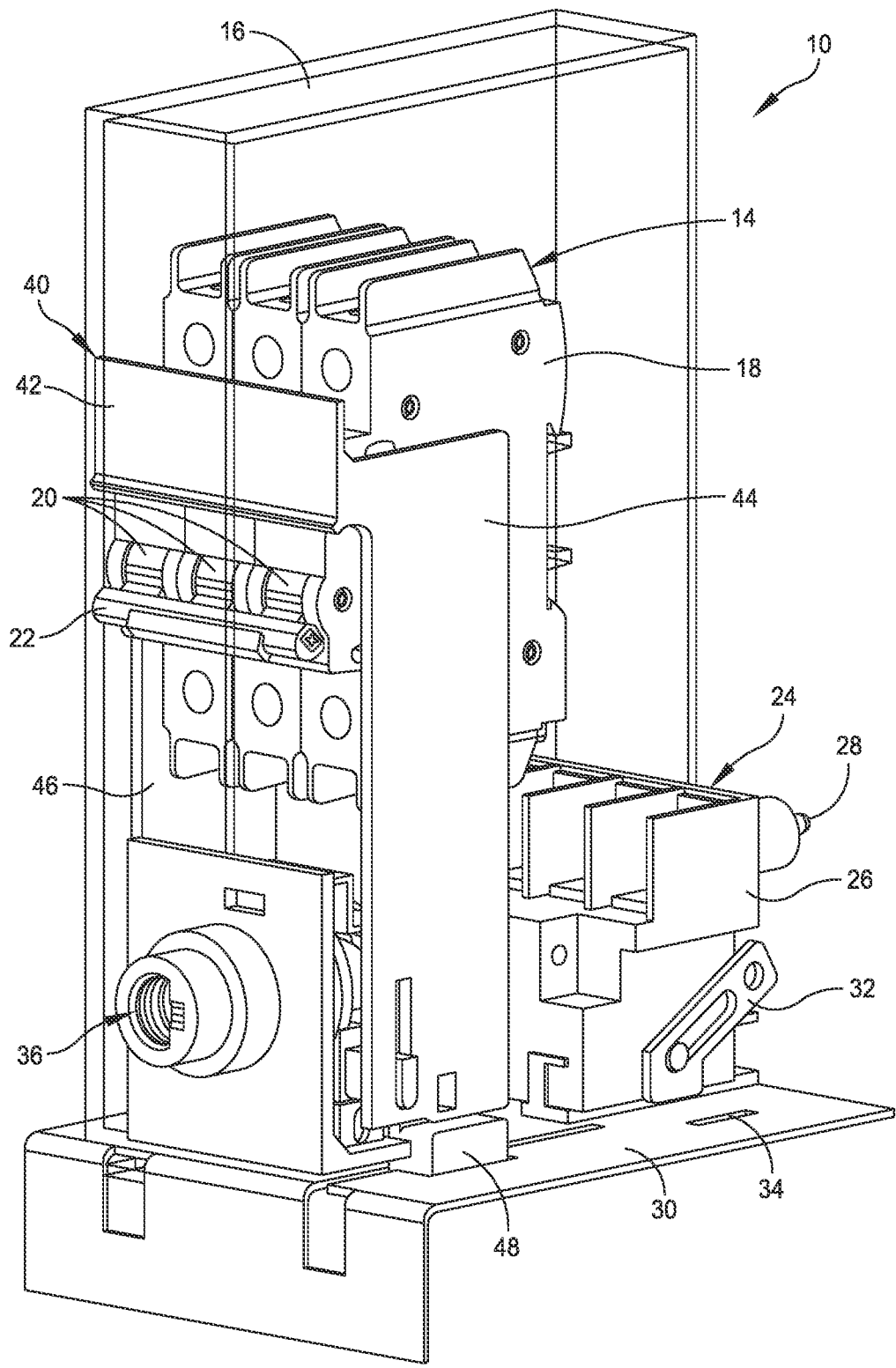
FIG. 1 is a perspective view of a power distribution system of an embodiment of the present disclosure.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing", "involving", and variations thereof herein, is meant to encompass the items listed thereafter and equivalents thereof as well as additional items.

As used herein, "enclosures" and "racks" are used to describe apparatus designed to support electronic equipment.

Embodiments of the present disclosure are directed to power distribution systems configured to avoid unwanted module engagement or disengagement with a circuit breaker in an ON position.

Embodiments of the present disclosure are directed to power distribution systems configured to mechanically lock a power distribution module into a panel in such a way that a potential electrical failure at the moment of the electrical contact is positioned away from the user toward a back of the module.

Embodiments of the present disclosure are directed to power distribution systems configured to reduce a risk of arc events by limiting the ability of a power distribution module removal until the circuit breaker is turned to an OFF position. Electrical contact between the power distribution module and a panel is interrupted, while remained locked into the distribution panel on any intermediate step.

Embodiments of the present disclosure are directed to power distribution systems having power monitoring capabilities offered within a power distribution module but supported by external devices, such as printed circuit board assemblies, displays, communication ports, and the like.

Embodiments of the present disclosure are directed to power distribution system configured to limit electrical contact by an operator when no power distribution modules are mounted or otherwise installed on a distribution panel.

Figure 2:
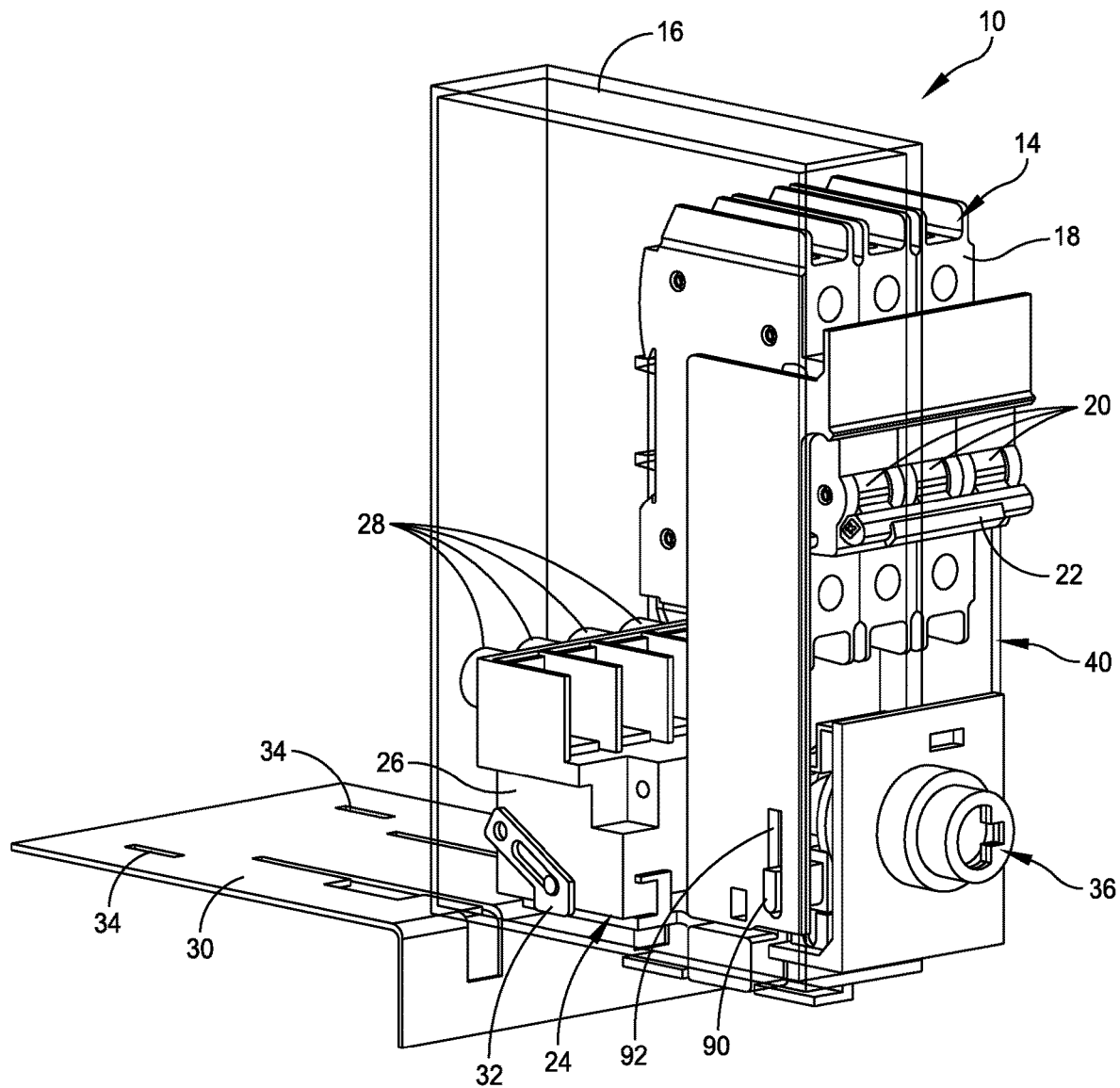
FIG. 2 is another perspective view of the power distribution system.
Figure 3:
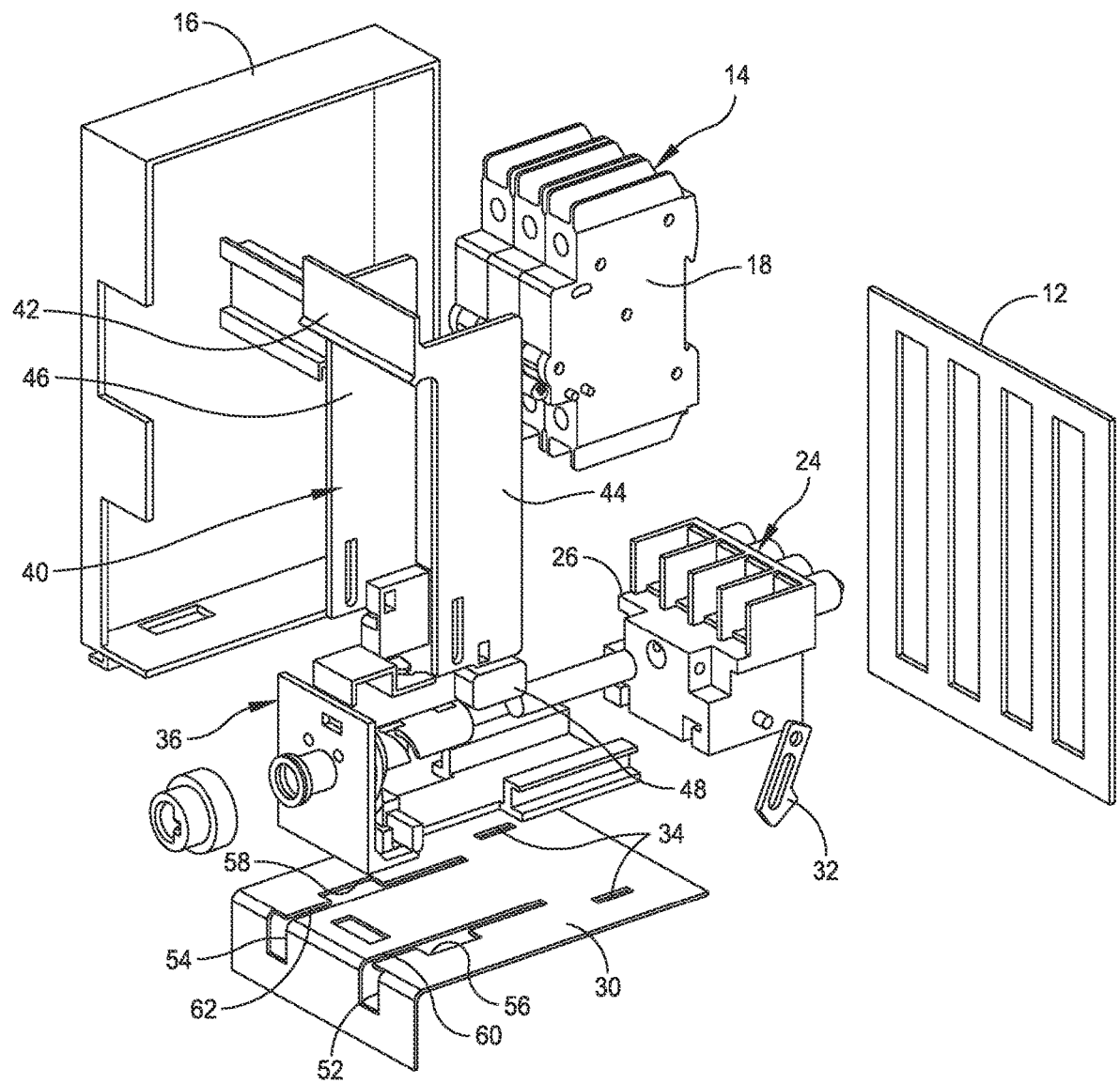
FIG. 3 is an exploded perspective view of the power distribution system.

Referring to the drawings, and more particularly to FIGS. 1-5, a power distribution system is generally indicated at 10. The power distribution system 10 of embodiments of the present disclosure is configured to be releasably secured to a power distribution panel 12, which is illustrated in FIG. 3.

In some embodiments, the power distribution panel 12 is a dedicated electrical panel that divides main power into several circuits, with the power distribution system 10 providing a circuit breaker for each circuit within the panel. In some embodiments, the power distribution system 10 is provided in a common enclosure or housing. It should be observed that the power distribution system 10 of embodiments of the present disclosure includes a circuit breaker enclosure equipped with rack in/rack out features for making connection to a power backplane connector. The rack in/rack out features are achieved by a series of mechanisms, including an interconnect mechanism, that serve to comply with the interlock systems of the design. The provision of the circuit breaker, the backplane connector and the interconnect mechanism described herein may collectively be referred to as a "power distribution module."

The power distribution system 10 includes a circuit breaker, generally indicated at 14, configured to protect each circuit from damage caused by excess current from an overloaded circuit or from a short circuit. The circuit breaker 14 is designed to interrupt current flow after a fault is detected and can be reset either manually or automatically to resume normal operation. The circuit breaker 14 shown and described herein can be designed to include switches for a desired amount of circuits. In the shown embodiment, the circuit breaker 14 is supported by a housing 16 provided as part of the power distribution system 10.

As shown, the circuit breaker 14 includes an enclosure 18 configured to support several circuit breaker switches, each indicated at 20. Although three (3) such switches 20 are shown, any number of switches can be provided. Moreover, the switches 20 are controlled by a common handle, indicated at 22, which when operated moves all three switches. Each switch 20 is movable between an ON position and an OFF position, with the circuit breaker 14 being configured to detect a fault condition in which the circuit breaker further is configured to automatically move one or more of the switches from the ON position to the OFF position. When this occurs, the handle 22 can be configured to move or "trip" all three switches 20 in the event one switch of the circuit breaker 14 is triggered. As shown in FIGS. 1 and 2, the handle 22 is shown in a rotated down position so that each switch 20 is in an OFF position. As mentioned above, it is desirable to install and remove the circuit breaker 16 when the switches 20 are in the OFF position.

The power distribution system 10 further includes a backplane connector, generally indicated at 24, which is configured to provide connection to the power distribution panel 12. In some embodiments, the backplane connector 24 includes an electrical module 26 having several electrical pins, each indicated at 28. The electrical pins 28 of the backplane connector 24 provide electrical connection to the power distribution panel 12 when the backplane connector is fully installed. A bottom surface of the electrical module 26 is configured to ride linearly along a rail 30. As will be described in greater detail below, the backplane connector 24 is configured to move along the rail 30 from a disengaged position shown in FIG. 2 to a fully engaged position shown in FIG. 1. The backplane connector 24 further includes an adjustable connector assembly configured to adjust the backplane connector. As shown, the adjustable connector assembly includes a lever 32 positioned on a side of the electrical module 26 and configured to engage an opening or slot 34 formed in the rail 30 to maintain the backplane connector in the fully engaged (or use) position. Another lever 32 can be provided on an opposite side of the electrical module 26 of the backplane connector 24 to further secure the electrical module in place when in the fully engaged position. In one embodiment the levers 32 are configured to move within their respective openings 34 due to the backplane connector 24 being fully engaged. For example, the lever 32 can be manipulated by a pin attached to the housing 16 to move the lever when the backplane connector 24 is fully engaged. In another embodiment, the levers 32 can be spring loaded to automatically enter the openings 34 when positioned over their respective openings when the backplane connector 24 is in the fully engaged position. The levers 32 can be manipulated by hand to be removed from their respective openings 34 when it is desired to move the backplane connector 24 to the disengaged position. As shown in FIGS. 1 and 2. the backplane connector is supported by the housing 16 as well.

The power distribution system 10 further includes an interconnect mechanism, generally indicated at 36, which is configured to connect the backplane connector 24 to the power distribution panel 12 when the backplane connector is moved from a disengaged position to an engaged position with respect to the power distribution panel. In some embodiments, the interconnect mechanism can embody a locking assembly that is configured to provide security to prevent the unwanted insertion and removal of the circuit breaker 14 and the backplane connector 24, especially when the switches 20 of the circuit breaker are in the ON position. The interconnect mechanism 36 is configured to move the backplane connector 24 to the fully engaged position in which the backplane connector engages (mechanically and electrically) the power distribution panel 12 and when this occurs to allow the movement of the switches 20 of the circuit breaker to the ON position. As shown in FIGS. 1 and 2, the interconnect mechanism 36 is supported by the housing 16 as well.

The power distribution system further includes a guard, generally indicated at 40, which is configured to interact with the rail 30 and the interconnect mechanism 36, and configured to cover portions of the enclosure 18 of the circuit breaker 14. As shown and described in greater detail below, the guard 40 further is configured to operate with the rail 30 to prevent or otherwise block or impede the circuit breaker switches 20 from moving from the OFF position to the ON position until the interconnect mechanism 36 connects to the circuit breaker 14 to the backplane connector 24.

Figure 4:
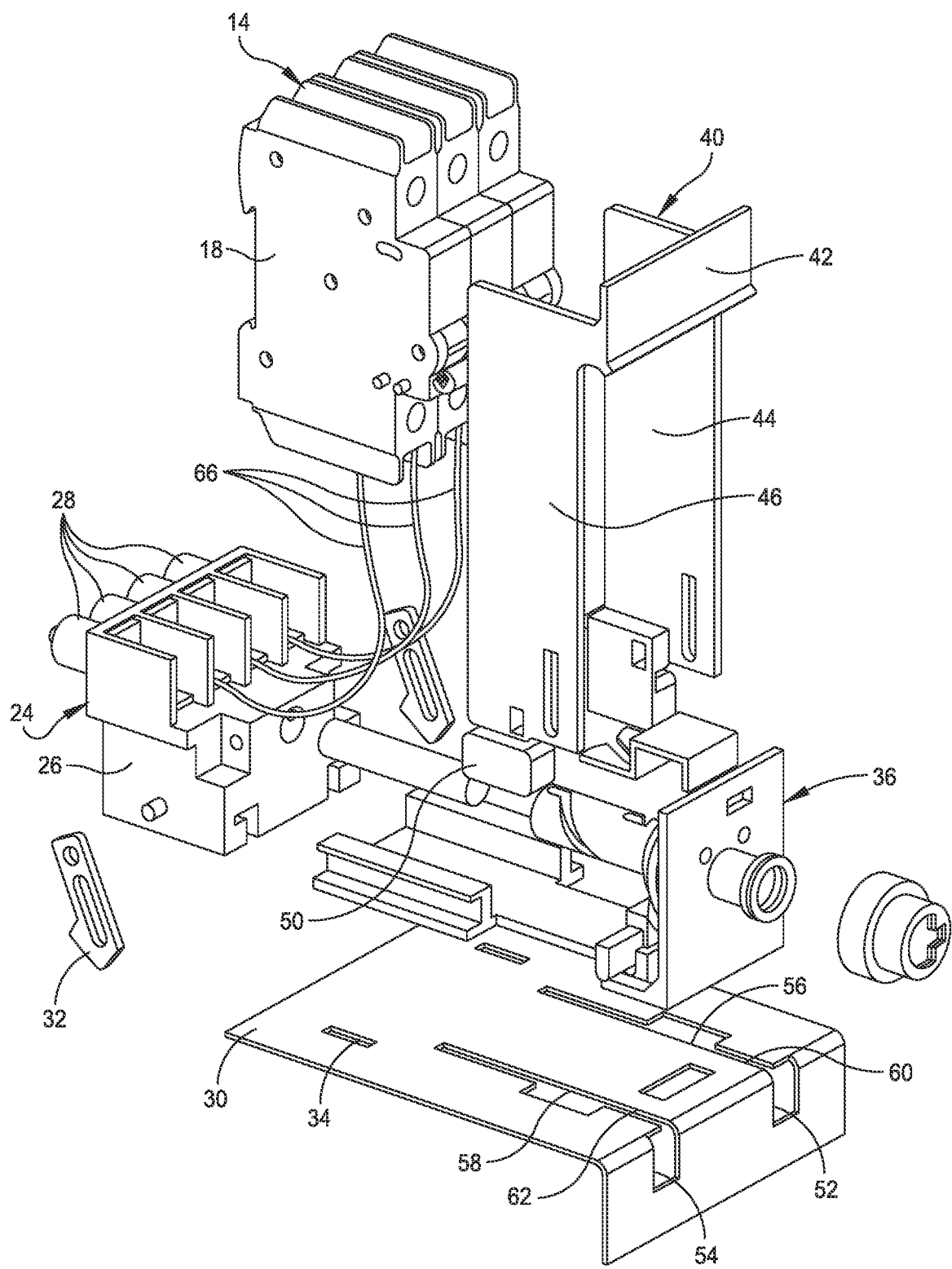
FIG. 4 is another exploded perspective view of the power distribution system.
Figure 5:
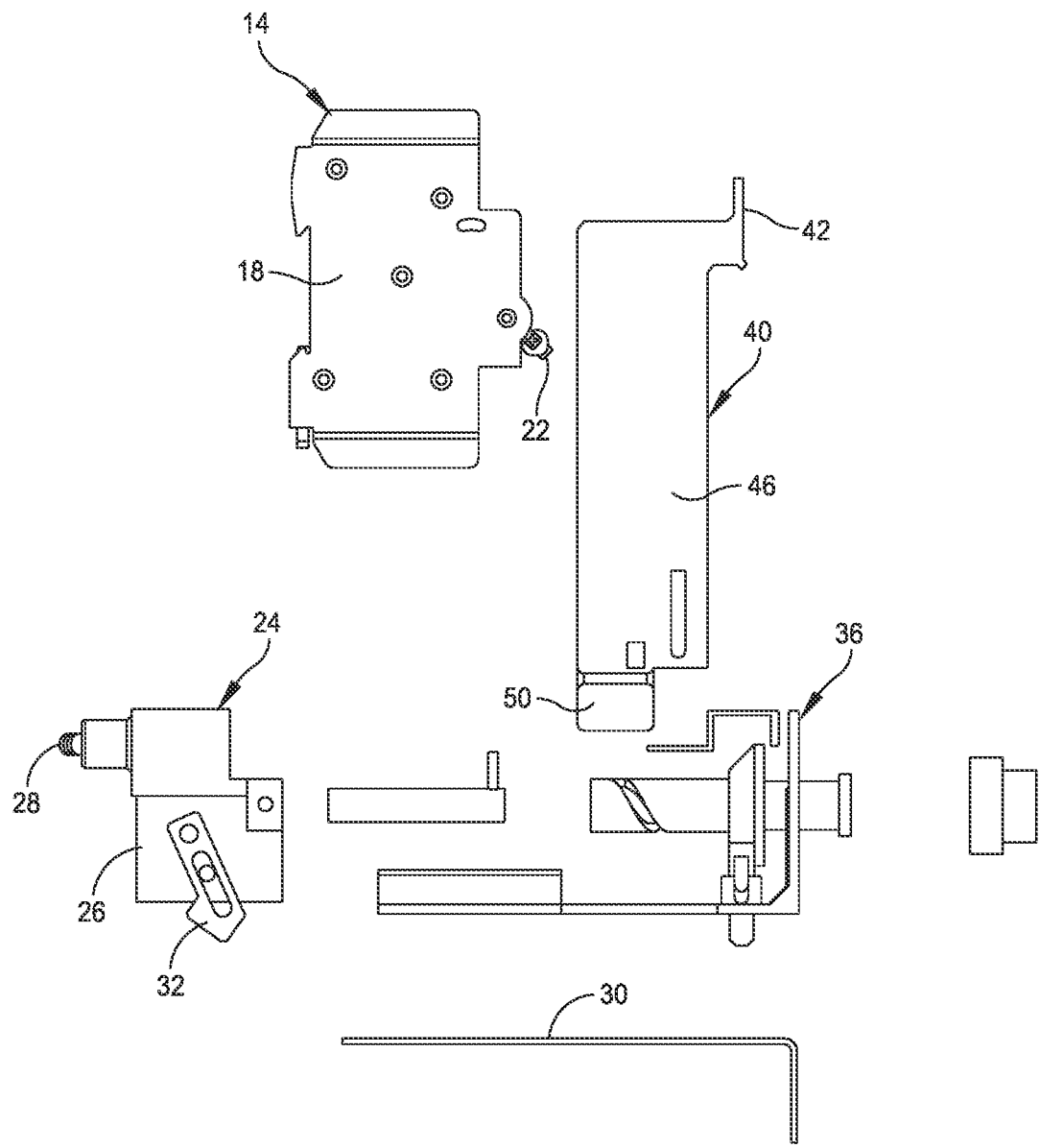
FIG. 5 is an exploded side view of the power distribution system.

In one embodiment, the guard 40 includes a front panel 42 and two side elements 44, 46. As shown in FIG. 1, a first side element 44 of the guard includes a first feature 48 configured to interact with the rail 30. Similarly, as shown in FIG. 4, a second side element 46 of the guard 40 includes a second feature 50 configured to interact with the rail. The first and second features 48, 50 are designed to retain the guard 40 in a first position (down) with respect to the rail 30 to prevent movement of the handle 22 of the circuit breaker 14 from the OFF position to the ON position and to permit movement of the guard to a second position (up) to enable movement of the handle of the circuit breaker from the OFF position to the ON position. The features 48, 50 engage the rail 30 to retain the guard 40 in the first position when the circuit breaker 14 and the interconnect mechanism 36 are in disengaged positions to prohibit movement of the switches 20 of the circuit breaker from the OFF position to the ON position. The features 48, 50 disengage the rail 30 when the circuit breaker 14 and the interconnect mechanism 36 are in engaged positions to permit the guard 40 to move to the second position to enable movement of the switches 20 of the circuit breaker to the ON position. The front panel 42 of the guard 40 is configured to prevent the handle 22 associated with the circuit breaker switches 20 from moving from the OFF position to the ON position. As shown, the first side element 44 extends from the front panel 42 along a first side of the enclosure 18 of the circuit breaker 14 and the second side element extends 46 from the front panel along a second side of the enclosure of the circuit breaker.

As shown, the rail 30 includes enlarged openings 52, 54 provided at a front edge of the rail and enlarged openings 56, 58 provided at a top surface of the rail. A narrow slot 62 is provided between the enlarged openings 52, 56 and another narrow slot 64 is provided between the enlarged openings 54, 58, with the narrow slots continuing beyond the second set of enlarged openings 56, 58. The narrow slots 60, 62 are sized to receive the narrow portions connecting the first and second features 48, 50 to their respective side elements 44, 46. The arrangement is such that the first and second features 48, 50 are presented to enter the first set of enlarged openings 52, 54 in which the first and second features engage a bottom surface of the rail 30 to prevent the up-and-down movement of the guard 40 with respect to the rail. Upon entry, the guard 40 can move laterally along a length of the rail 30 with the first and second features 48, 50 preventing the up-and-down movement of the guard. Once the first and second features 48, 50 are presented to enter the second set of enlarged openings 56, 58, the guard 40 is capable of moving upwardly with respect to the rail 30 as the first and second features move through their respective enlarged openings 56, 58.

Figure 25:
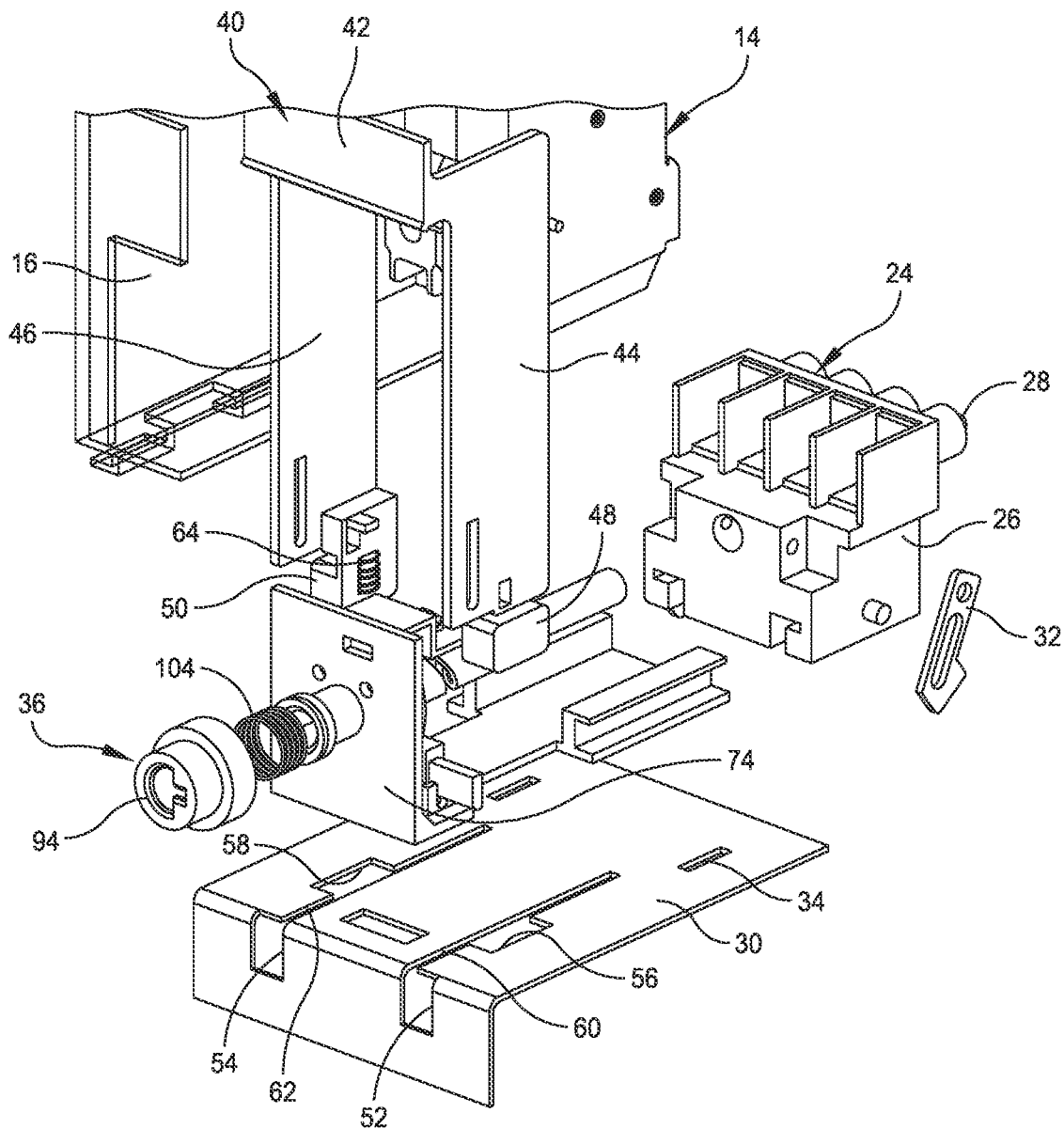
FIG. 25 is a perspective view of aspects of the power distribution system.

A spring 64 (FIG. 25) is provided to bias the guard 40 to the second position. As shown, the spring is embedded in the second feature 50, with the first feature 48 having a similar spring and construction. The spring 64 is coupled to the guard 40 and the housing 16 so that when the first and second features 48, 50 are presented to the second set of enlarged openings 56, 58 formed in the rail 30, the spring moves the guard upwardly as the first and second features clear their respective enlarged openings.

The guard 40 remains on the circuit breaker 14 without obstructing the operation of the power distribution system 10 under normal circumstances. An aspect of the guard 40 is to ensure that the circuit breaker 14 is in the OFF position each time the circuit breaker is being prepared to be taken in or out. The circuit breaker 14 can be moved by manually moving the guard 40 down. If not done properly, the power distribution system 10 includes interlocks as described herein to prevent removal.

Referring particularly to FIG. 4, flexible cables, each indicated at 66, are provided to connect the circuit breaker 14 to the backplane connector 24. In the shown embodiment, the three circuit breaker switches 20 of the circuit breaker 14 are connected to three pins 28 of the backplane connector 24 by the flexible cables 66. In the shown embodiment, the backplane connector 24 includes four (4) pins 28; however, as with the circuit breaker 14, any number of pins can be provided.

In one embodiment, the interconnect mechanism 36 includes an L-shaped bracket 70 having a horizontal portion 72 configured to ride along and be secured to the rail 30 and an upright portion 74 extending from the horizontal portion 72. The interconnect mechanism 36 further includes a locking assembly coupled to the rail 30 and to the guard 40. The locking assembly is configured to secure the circuit breaker 14 in the engaged position. The locking assembly includes a cylindrical barrel 76 secured to the upright portion 74 of the L-shaped bracket 70 and a mechanical tab 78 also secured to the upright portion 74. The cylindrical barrel 76 has a slot 80 formed therein, the cylindrical barrel housing a piston 82 having a pin 84. The piston 82 is received in the cylindrical barrel 76 with the pin 84 being received in the slot 80 formed in the mechanical tab 78 and a slot 85 formed in the cylindrical barrel. The pin 84 is configured to move from a retracted position to an extended position by rotating the cylindrical barrel 76. The purpose of the pin 84 is to engage and move the backplane connector 24 to the fully engaged position described above. Upon rotating the cylindrical barrel 76 in a clockwise direction, the pin 84 extends to move the backplane connector 24. Upon rotating the cylindrical barrel 76 in a counterclockwise direction, the pin 84 retracts to enable the backplane connector 24 to move to the disengaged position.

Figure 25A:
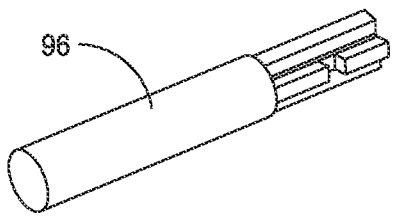
FIG. 25A is a perspective view of a tool used with a locking assembly of the power distribution system.

The locking assembly further includes a first locking bar 86 provided to lock the guard 40 in place when the cylindrical barrel 76 is rotated clockwise. As shown, the locking bar 86 extends through a slot 88 provided in the side element 44 of the guard 40 to enable the guard to move upwardly when in the engaged or operating condition. Similarly, the locking assembly further includes a second locking bar 90 that extends through a slot 92 provided in the side element 46. The cylindrical barrel 76 includes a tool slot 94 presented at a front of the cylindrical barrel, the tool slot being configured to receive a tool (or key) 96 (FIG. 25A), which is provided to rotate the cylindrical barrel. Specifically, the tool 96 is configured to lock and unlock the locking assembly to enable the insertion and removal of the housing 16 having the circuit breaker 14, the backplane connector 24 and the interconnect mechanism 36.

In one embodiment, the tool slot 94 has a unique shape and the tool 96 has a mating unique shape configured to be received by the tool slot. The shape of the tool slot 94 and the tool 96 can be customized to achieve a unique shape to prevent unwanted access to the locking assembly. For example, in one embodiment, the tool 96 has a feature on a tip of it to guarantee that the tool remains inside tool slot 94 until the backplane connector 24 is fully deployed. When the tool 96 enters the tool slot 94, the circuit breaker 14 is turned off and the proper interlocks are deployed.

As described, the interconnect mechanism 36 is secured to the rail 30, with the interconnect mechanism and the backplane connector 24 being configured to ride along the rail 30. The adjustable connector assembly of the backplane connector 24 is configured to secure the backplane connector to the rail 30. Once secured, the pins 28 of the backplane connector 24 are configured to engage busbars associated with a power distribution panel 12 (FIG. 4). The backplane connector 24, once extended, provides safe contact to the power distribution panel 12 through the electrical pins 28. The backplane connector 24 can be designed in a way that it opens panel shutters if required. When extended, the backplane connector 24 also maintains the power distribution module in position due to the interlocks. When extended, the power distribution module is outside the power distribution panel 12. The backplane connector 24 prevents the insertion of the power distribution module into the power distribution panel 12 through the proper interlocks.

In some embodiments, the power distribution system 10 includes a position flag 100, which is provided to show if the backplane connector is retracted or extended. The position flag 100 is shown through an opening 102 provided in the upright portion 74 of the L-shaped bracket 70. In one example, the position flag 100 can show a first color, e.g., red, if the backplane connector 24 is retracted and out of position, and a second color, e.g., green, if the backplane connector is extended and in a use position.

Figure 6A:
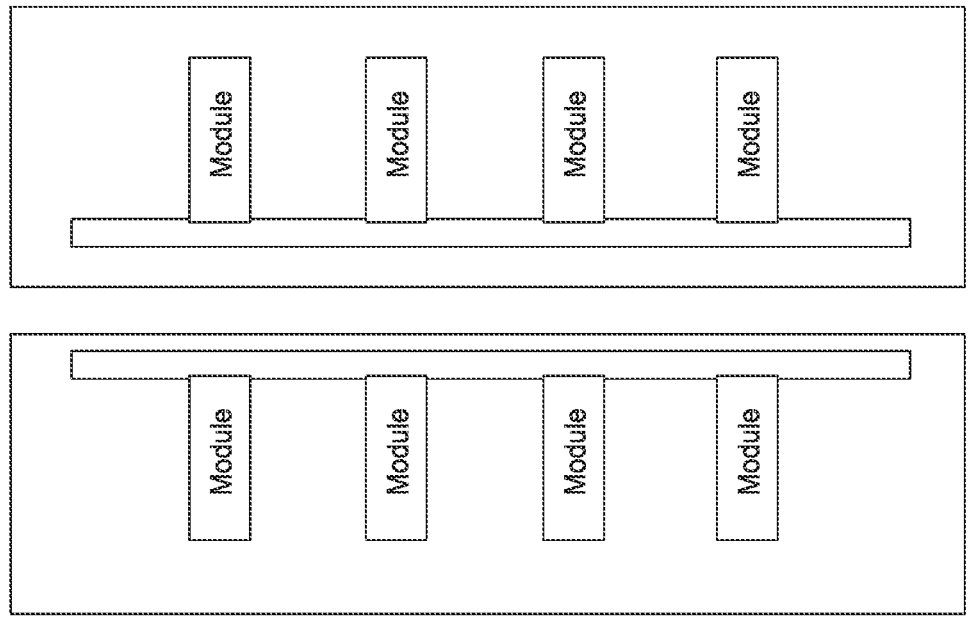
FIGS. 6A and 6B are schematic views of orientations of power distribution modules within an equipment rack.
Figure 6B:
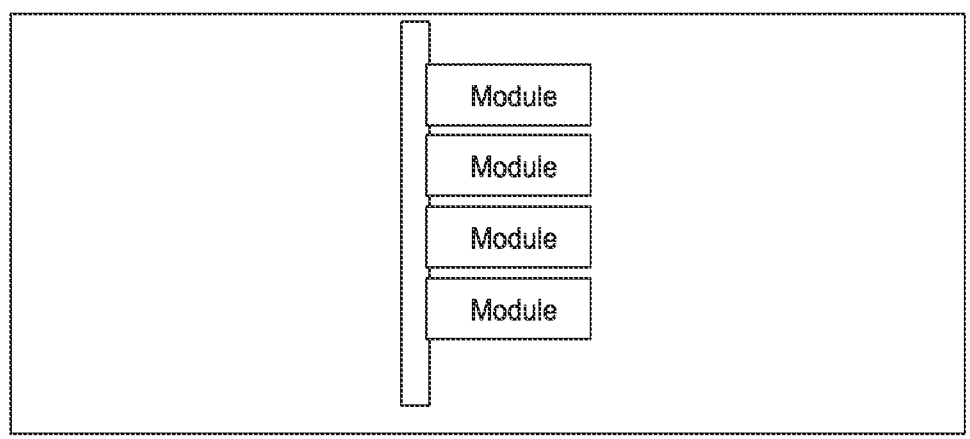

Referring to FIGS. 6A and 6B, in one embodiment (FIG 6A), the rail can be designed in a way that keeps the switches of the circuit breaker of the power distribution system vertical, horizontal or hanging from the top. In another embodiment (FIG. 6B), power distribution system and the rail can be configured to support several circuit breakers adjacent to one another.

Figure 7:
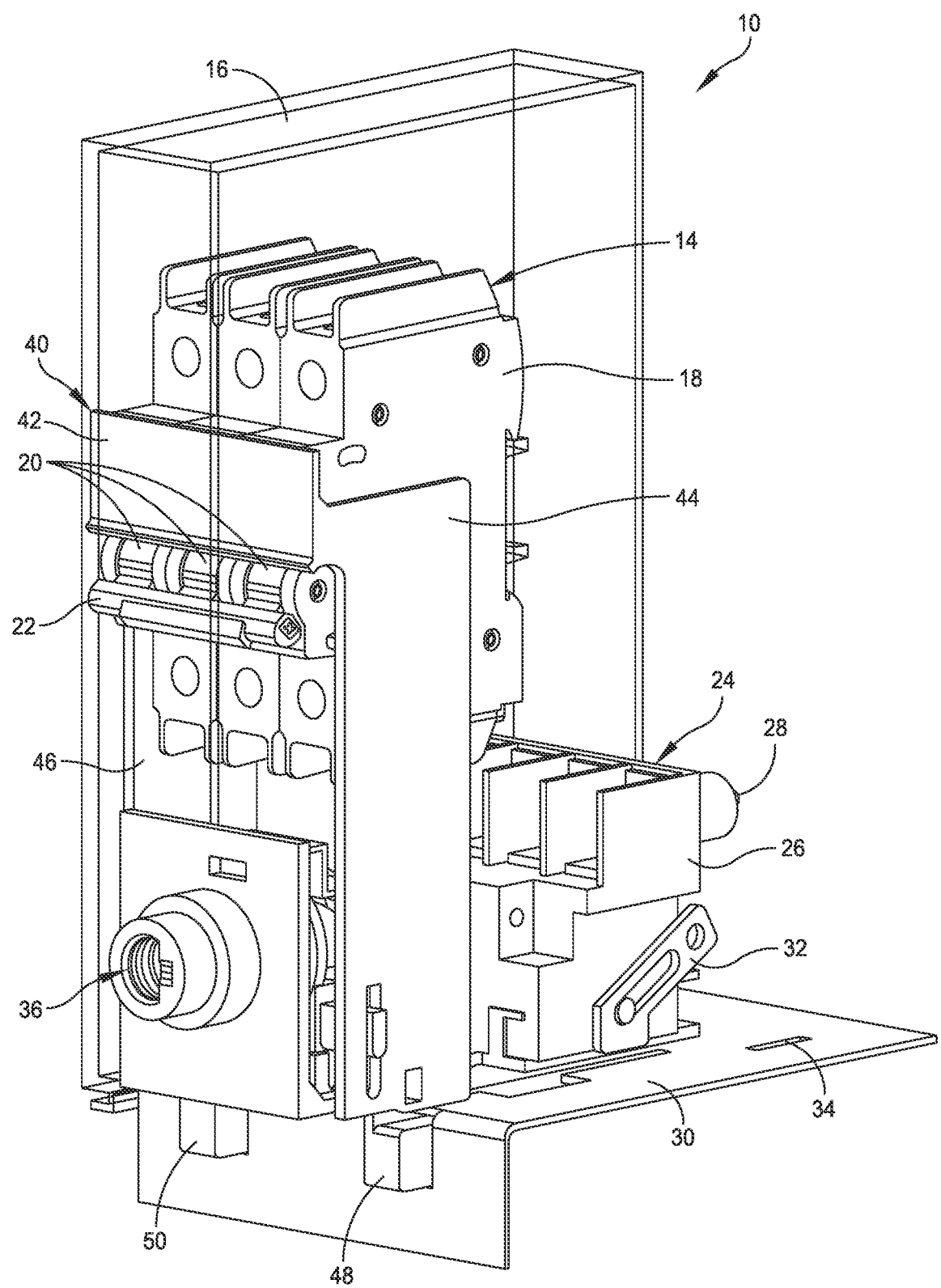
FIGS. 7-15 are views of the power distribution system showing the insertion of a power distribution module.
Figure 8:
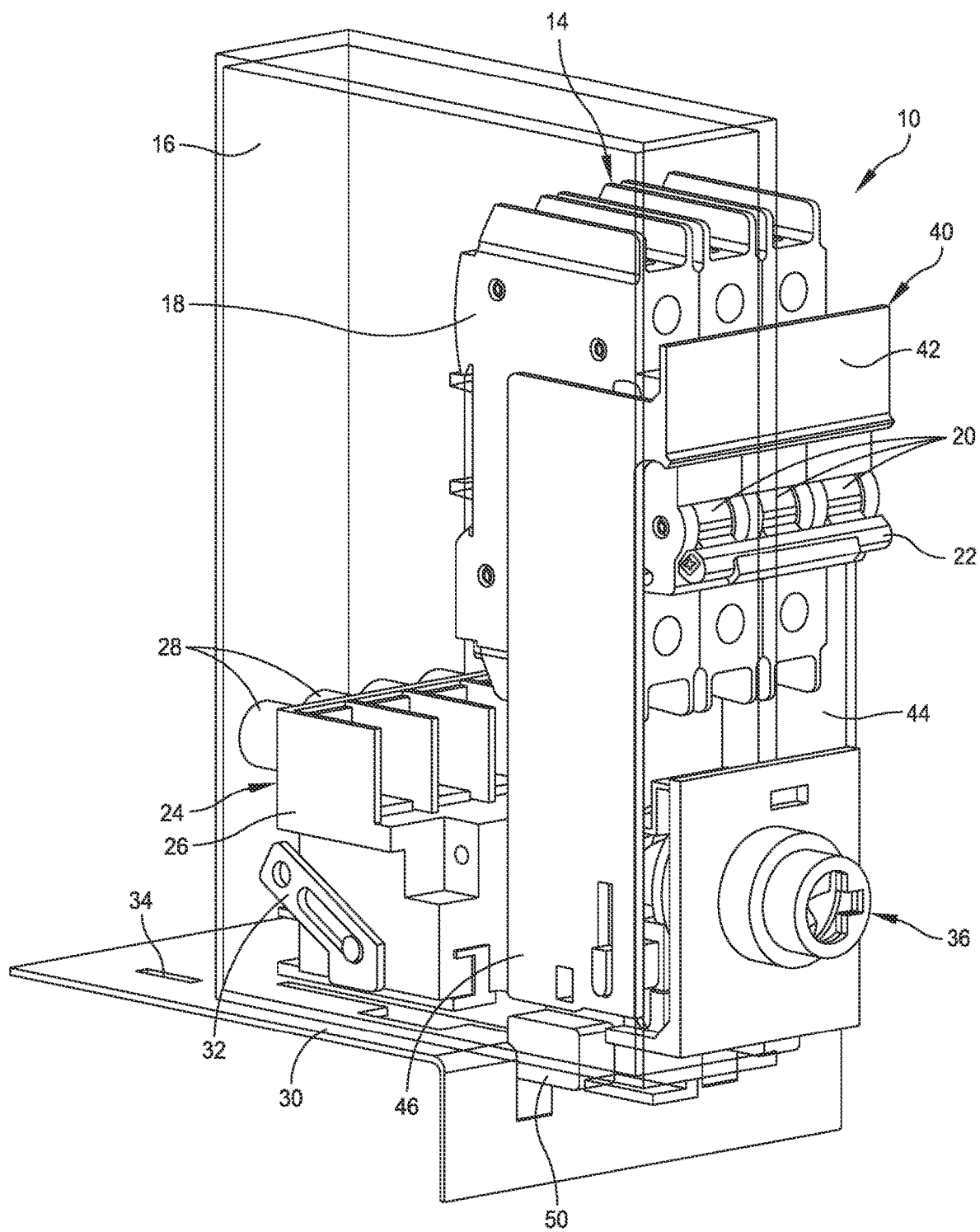
Figure 9:
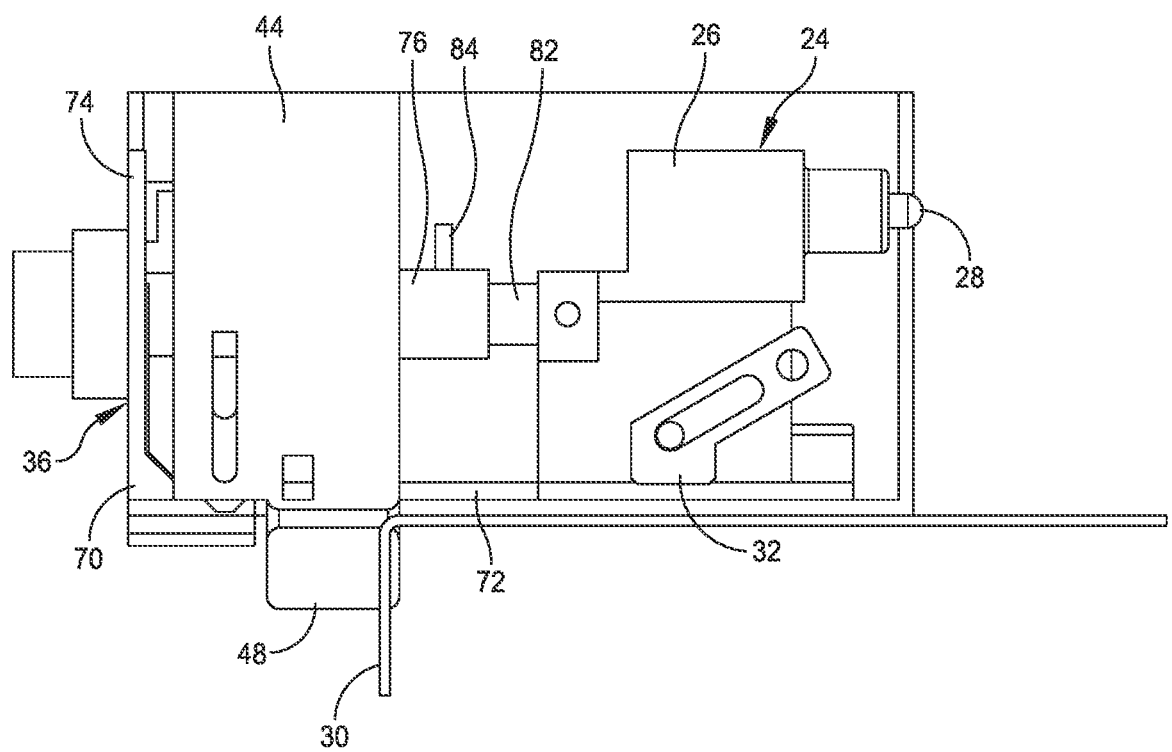
Figure 10:
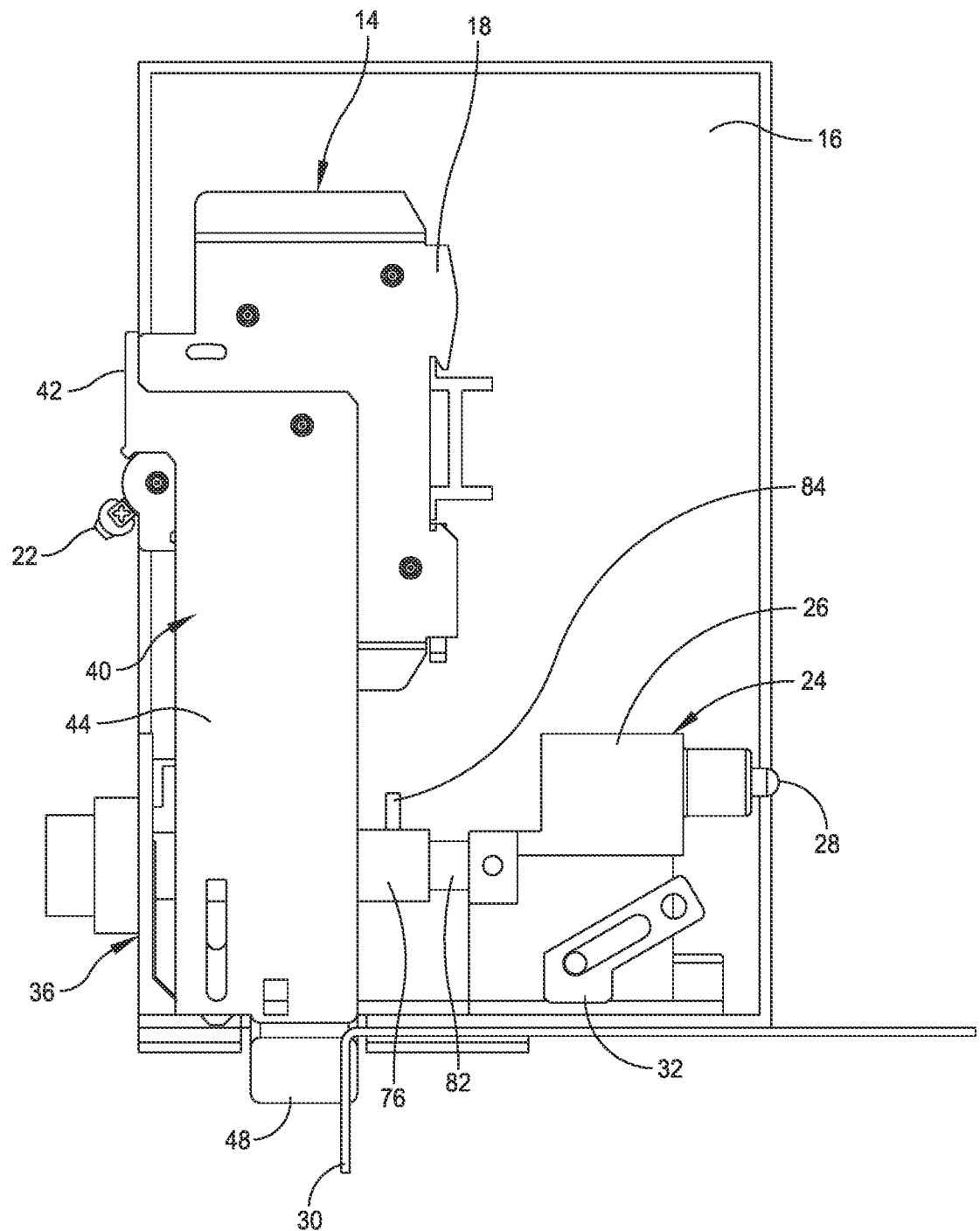
Figure 11:
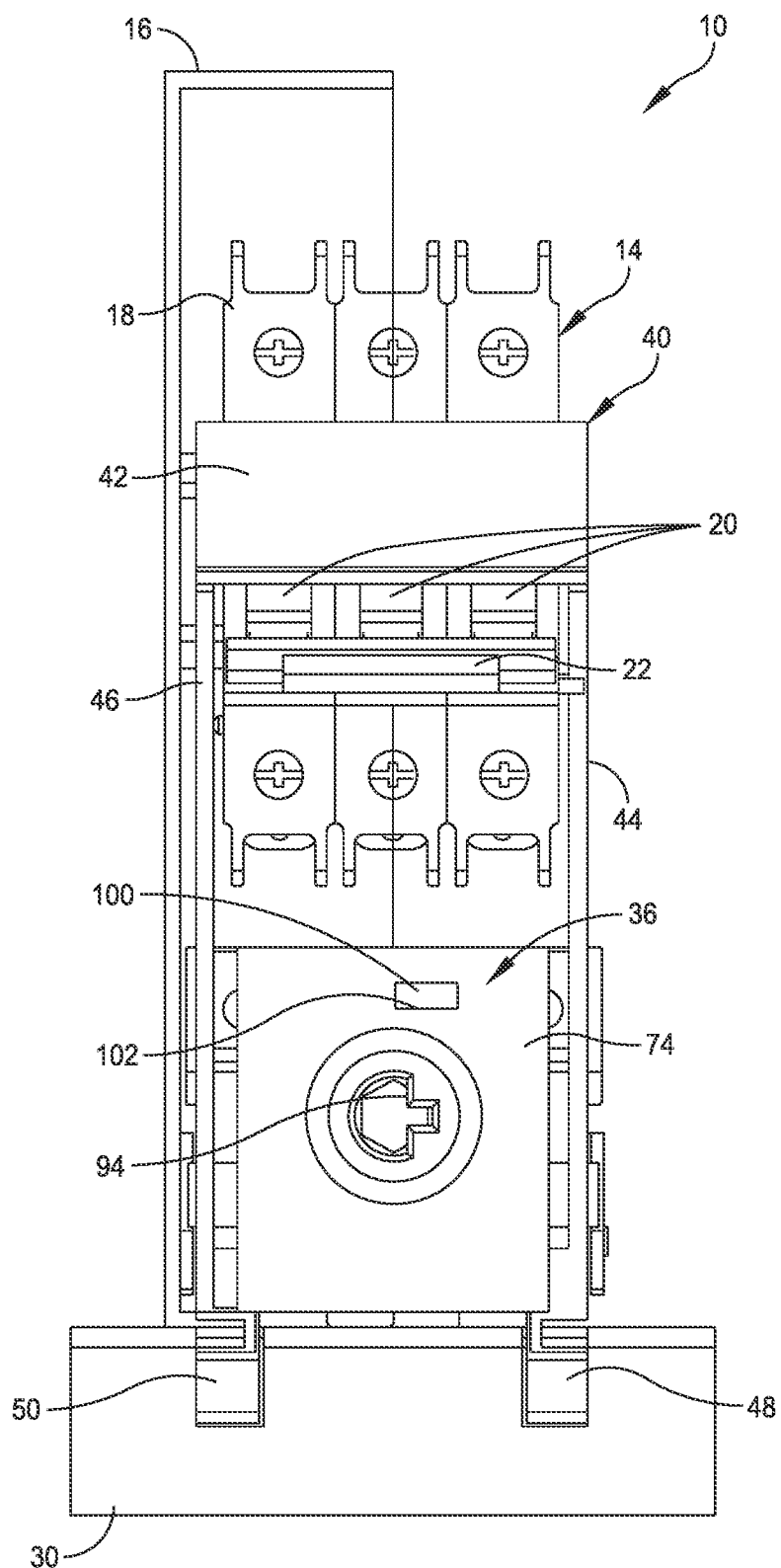
Figure 12:
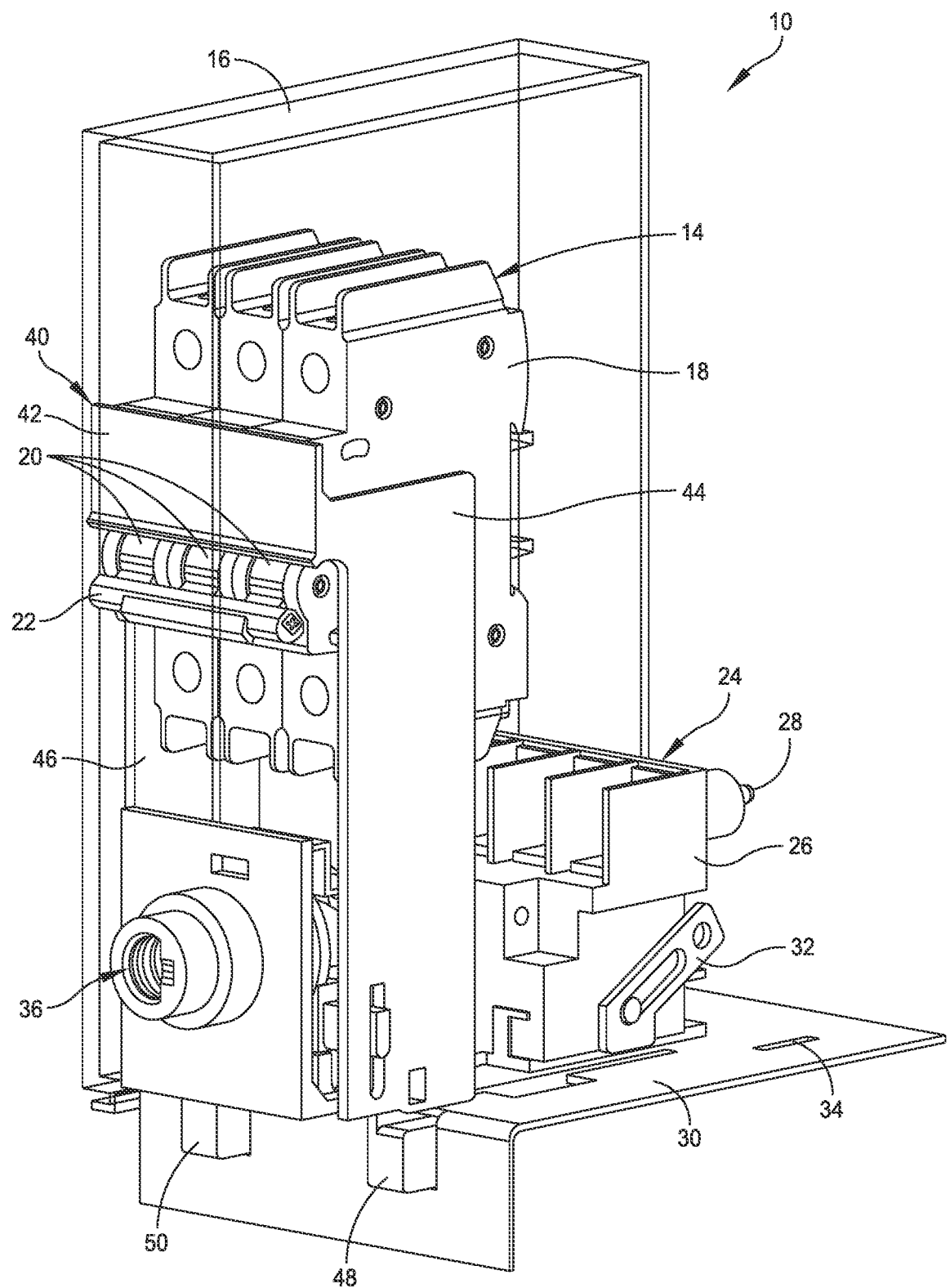
Figure 13:
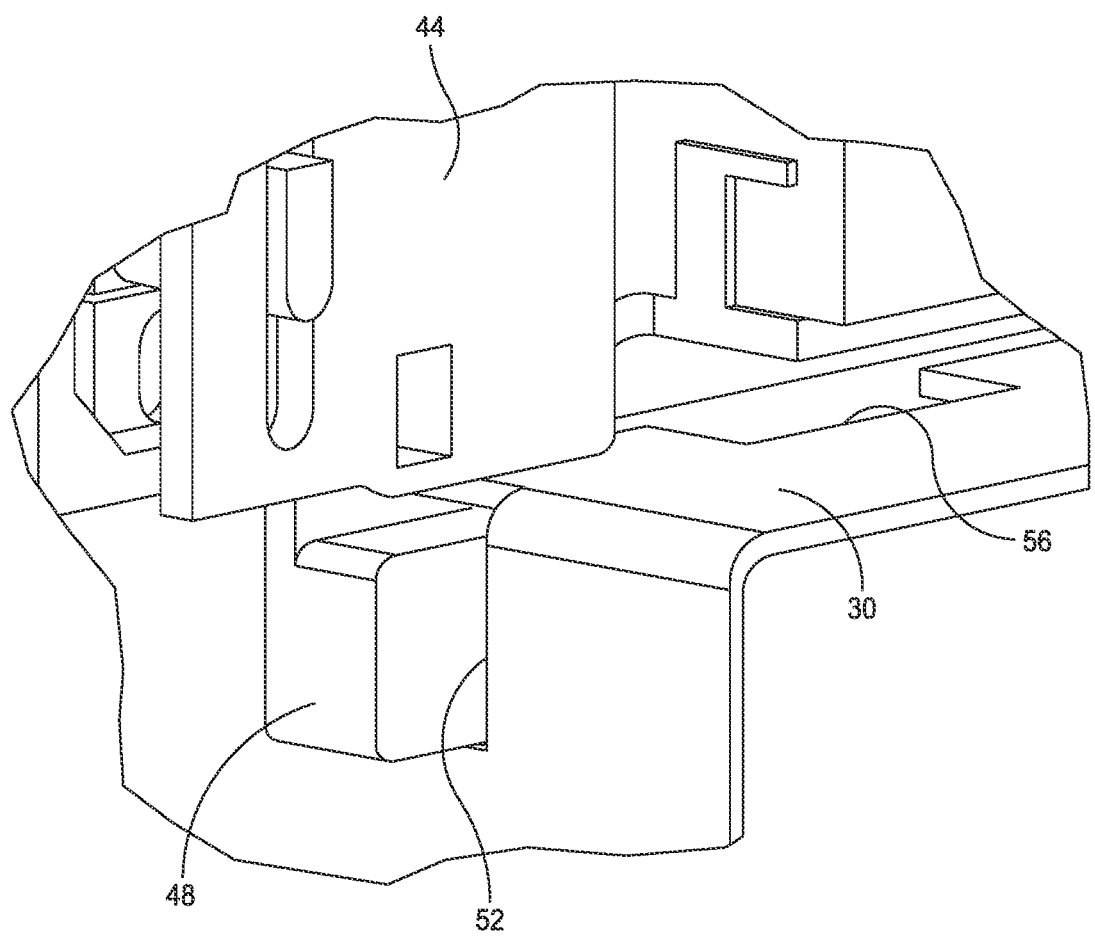

Referring to FIGS. 7-15, the process of inserting a power distribution module having the circuit breaker 14, the backplane connector 24 and the interconnect mechanism 36, enclosed by the housing 16, is described. As shown in FIG. 7, the power distribution module is presented to the rail 30 until it reaches a first interlock. This interlock prevents the insertion of the power distribution module prior to checking whether the circuit breaker 14 is in an OFF position. As shown in FIGS. 8 and 9, if the guard 40 is raised to enable the switches 20 of the circuit breaker 14 to be moved from the OFF position to the ON position, the first and second features 48, 50 of the guard interfere with the rail 30 to prevent the module from being slid onto the rail.

Referring to FIGS. 10-13, to ensure the power distribution module is capable of being presented to the rail 30, the guard 40 must be lowered so that the first and second features 48, 50 can enter the enlarged openings 52, 54 at the front of the rail. Specifically, a user pushes a guard 40 down, turning off the circuit breaker 14 and at the same time allowing the power distribution module to travel further. By pressing the guard 40, the interconnect mechanism 36 allows the power distribution module to continue into the rail 30 to complete the installation.

Figure 14:
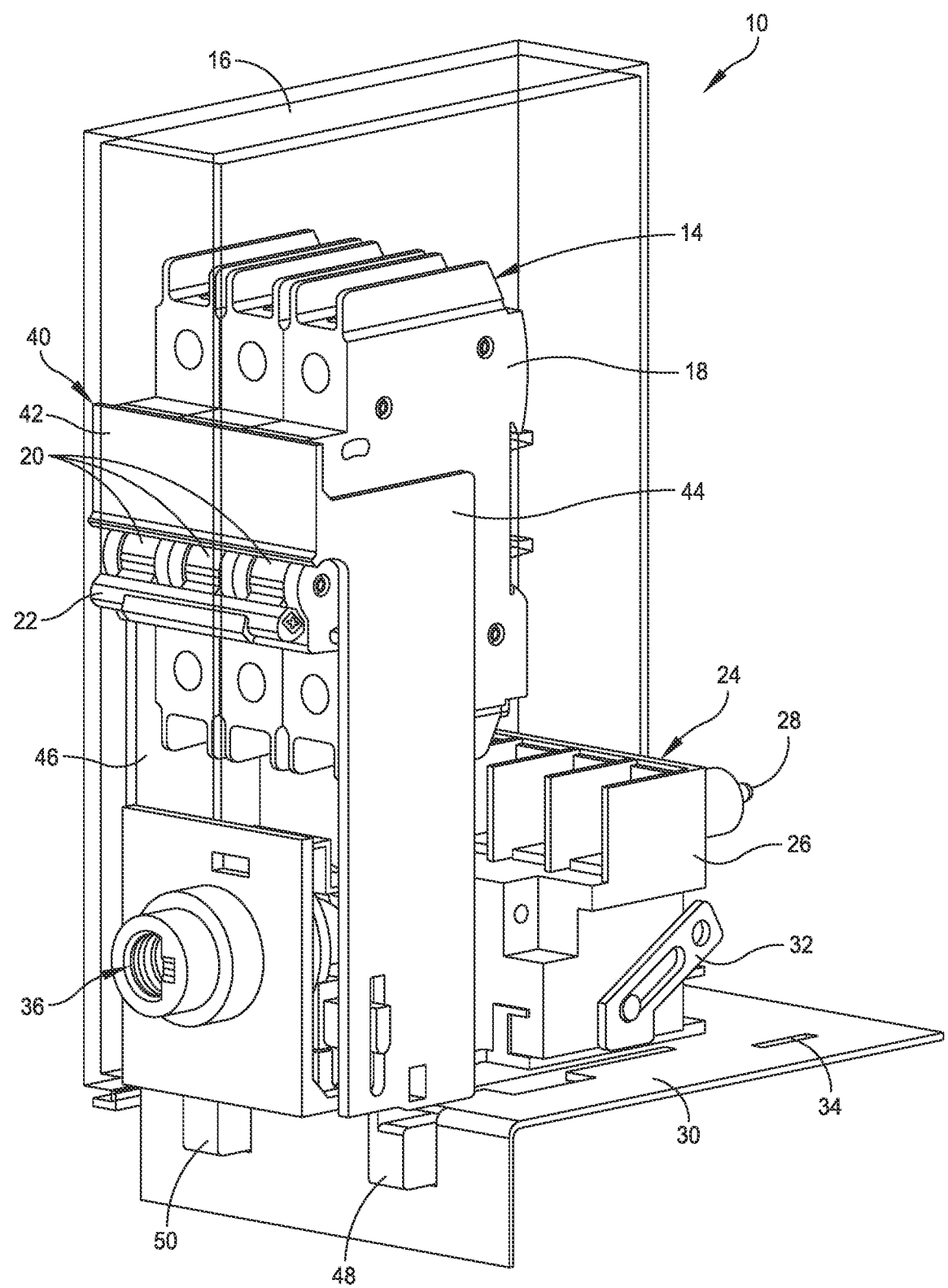
Figure 15:
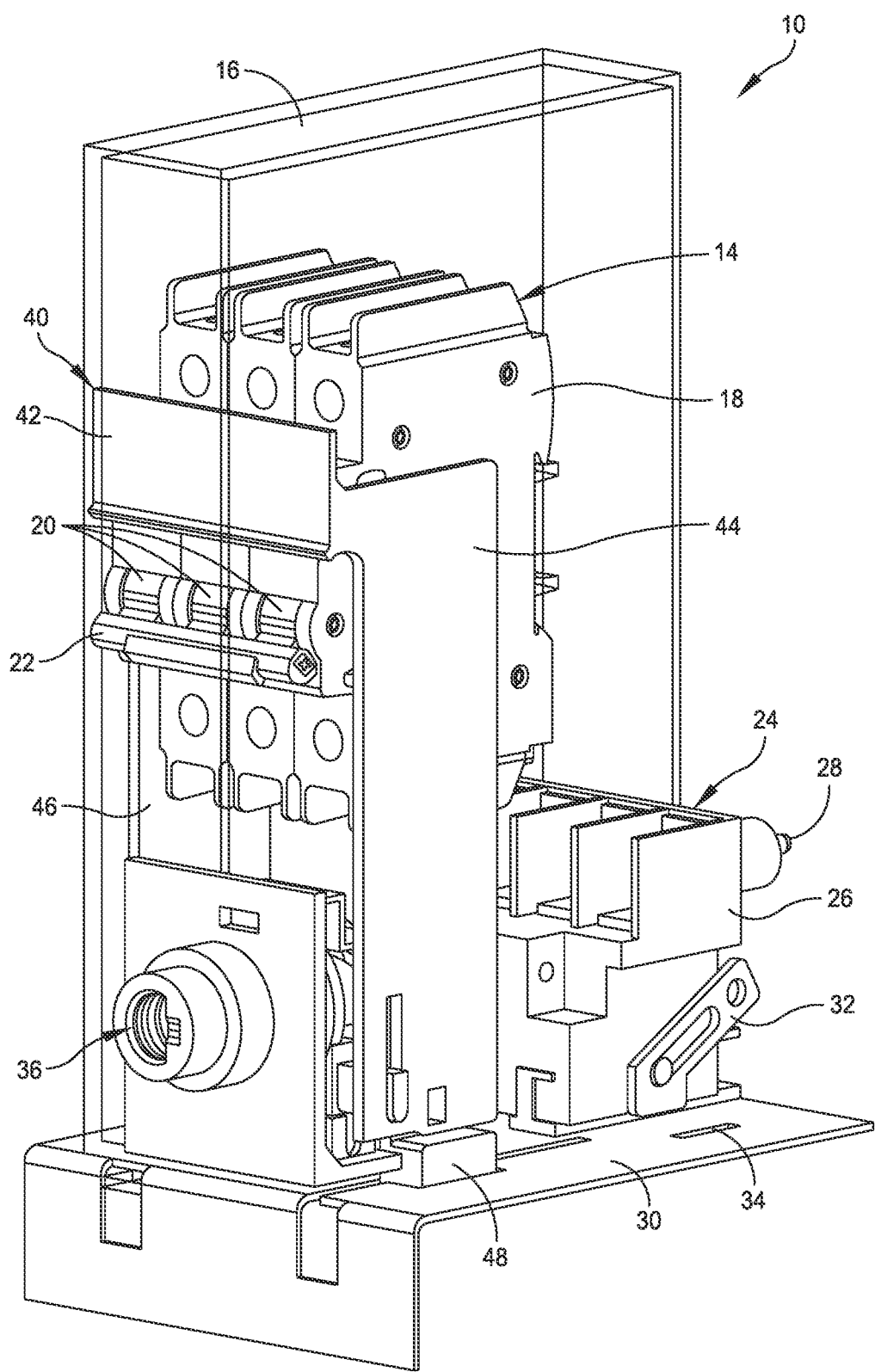

Referring to FIGS. 14 and 15, when completely installed, the guard can be moved upwardly to free up the circuit breaker handle and to lock the module, although no electrical contact exists at this point. Specifically, the first and second features can move through the enlarged openings formed in the rail. When provided, the spring may automatically move the guard to the upward position.

Figure 16:
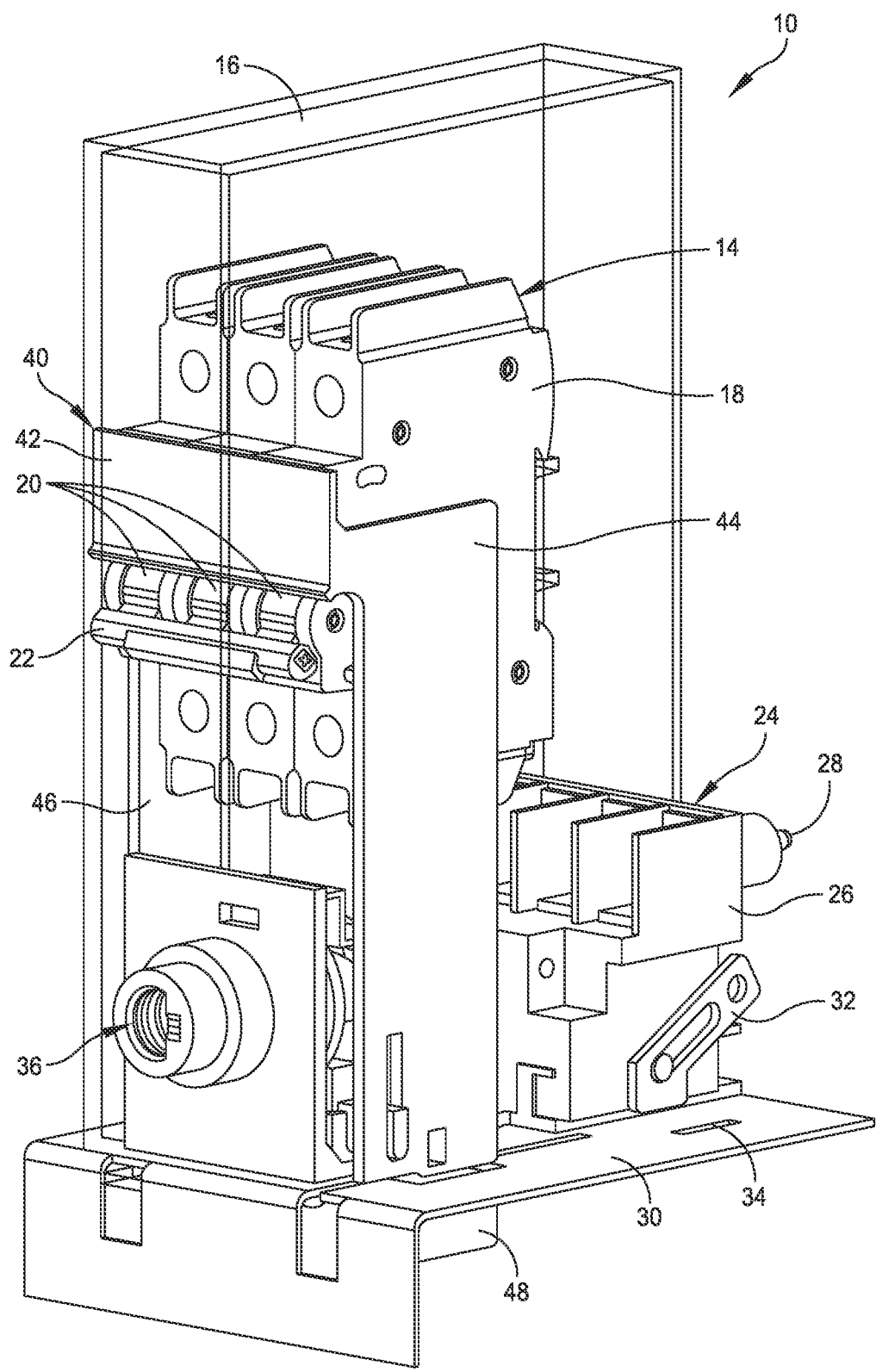
FIG. 16-18 are views of the power distribution system showing a racking in/out procedure.
Figure 17:
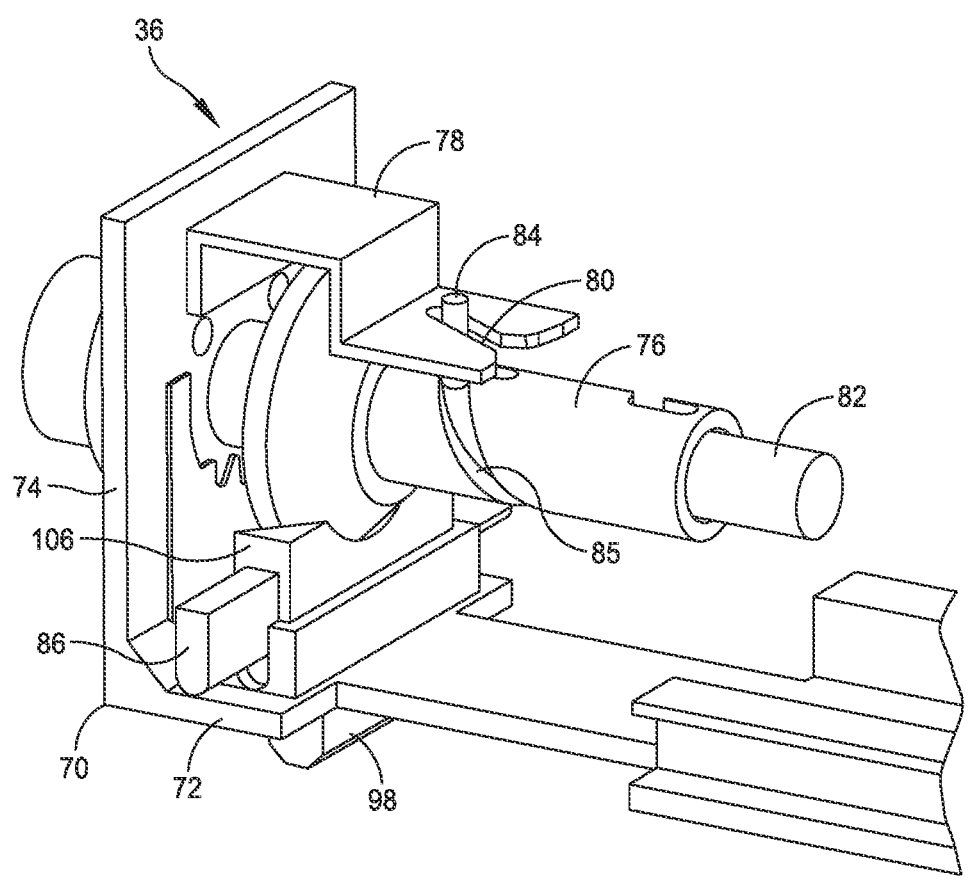
Figure 18:
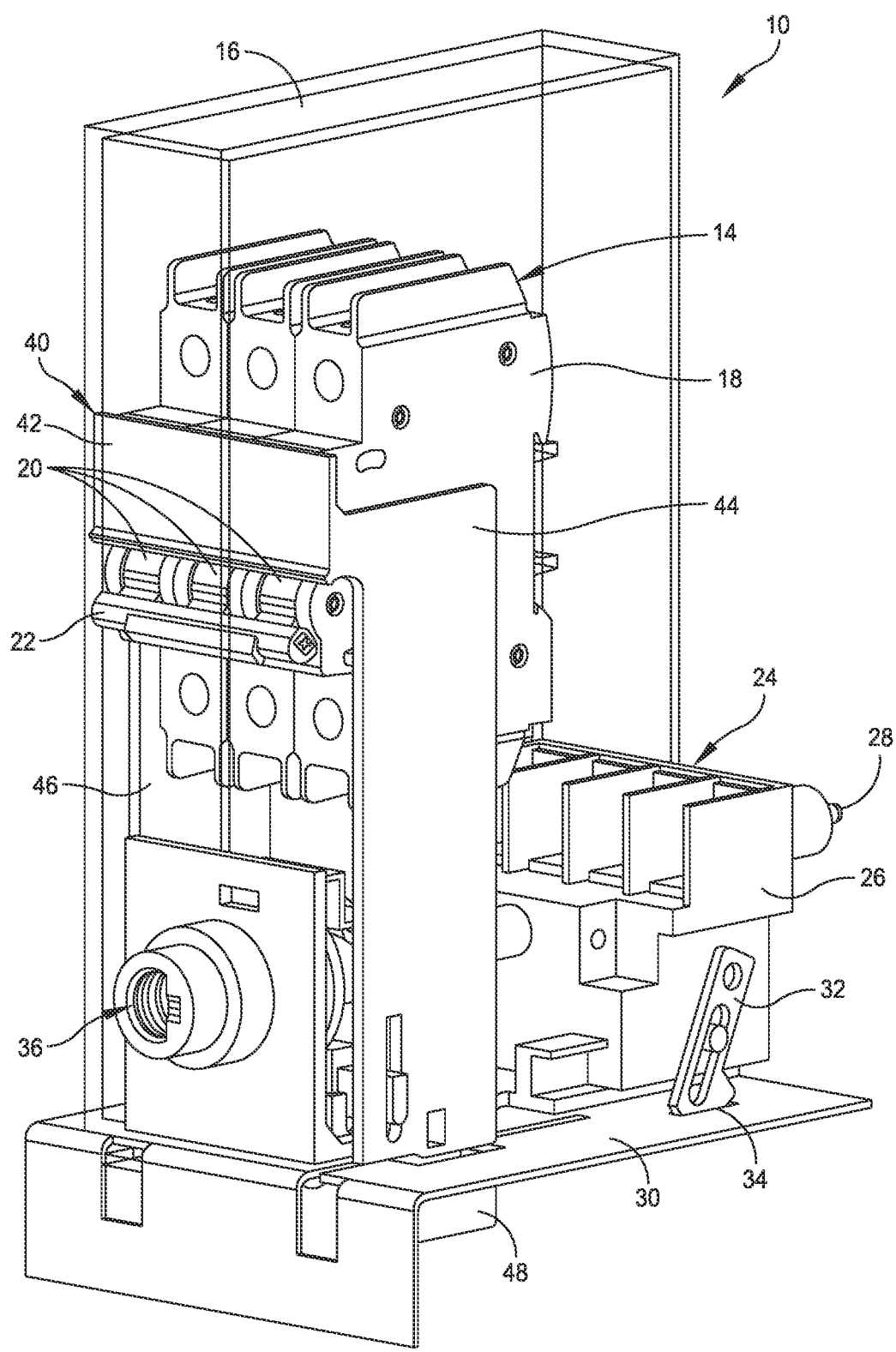

Referring to FIGS. 16-18, to move the backplane connector 24 from the disengaged position (FIG. 16) to the engaged position (FIG. 18), the tool (key) 96 is inserted into the tool slot 94 locking assembly of the interconnect mechanism 36. When the tool 96 is inserted into the locking assembly and rotated to rotate the cylindrical barrel 76, a locking tab 98 provided at a bottom of the horizontal portion 72 of the L-shaped member 70 travels through down through an opening formed in the rail 30 to lock the power distribution module in place on the rail and to assure that the circuit breaker 14 is turned off at the same time. The locking bars 86, 90 are also extended into the respective slots 88, 92 of the side elements 44, 46. When the interconnect mechanism 36 becomes "racked in," the interconnect mechanism can be provided with a third set of "legs" that extend through openings of the rail 30 to maintain the attachment of the power distribution module to the rail.

Figure 19:
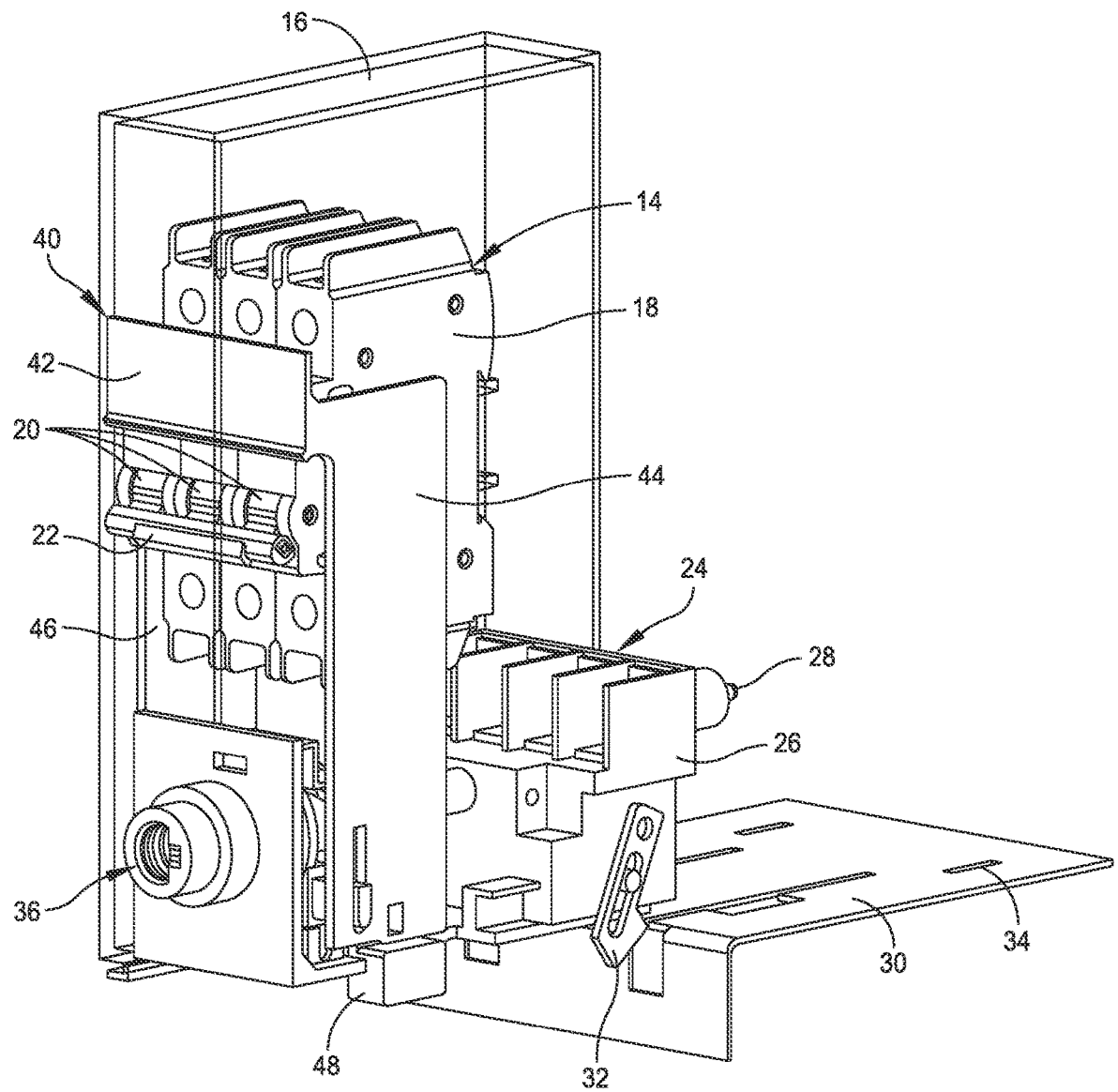
FIG. 19 is a perspective view of the power distribution system showing a racking in procedure with a backplane connector extended.
Figure 20:
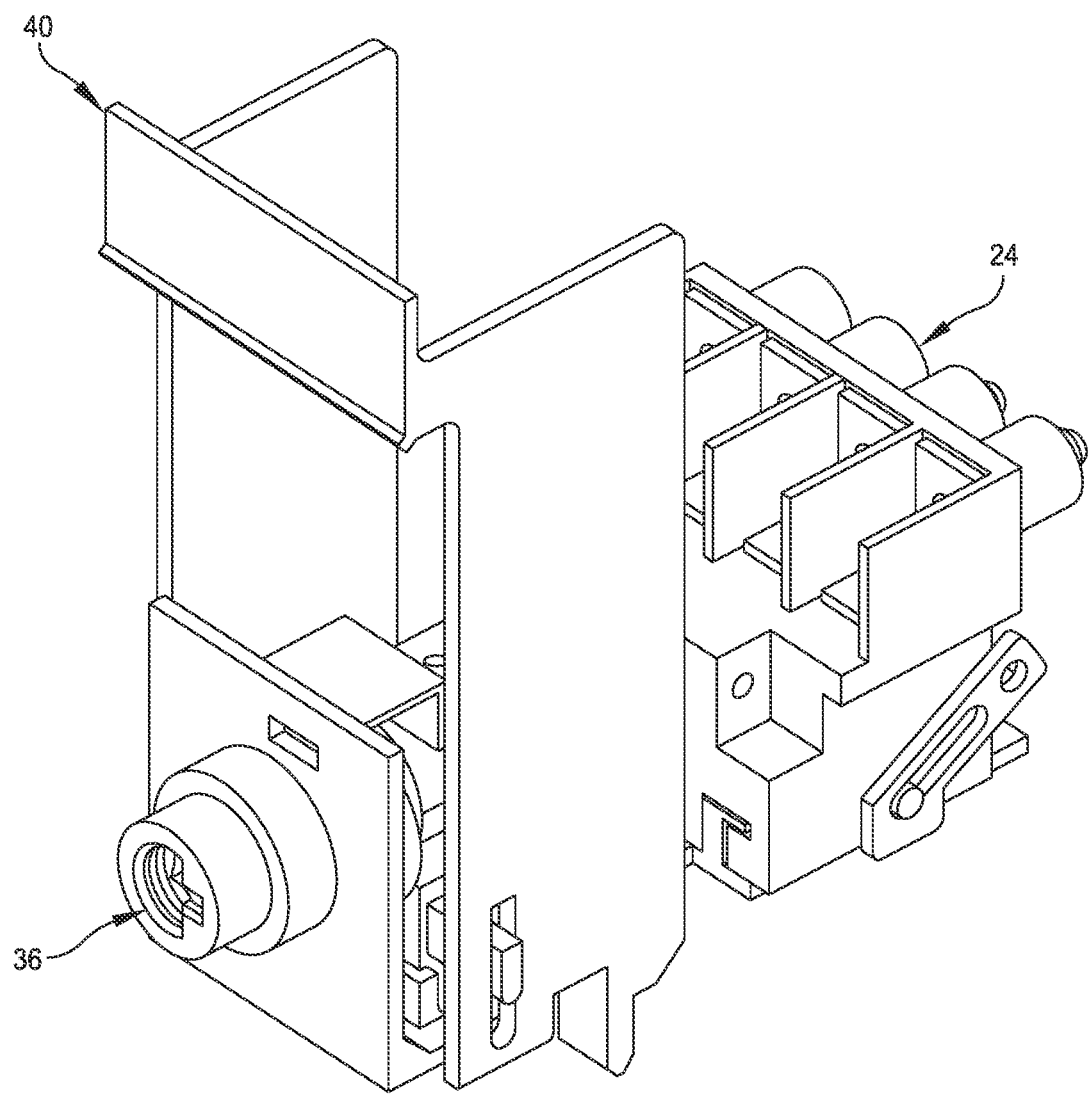
FIGS. 20-24 are views of the power distribution system showing a racking mechanism of the system.
Figure 21:
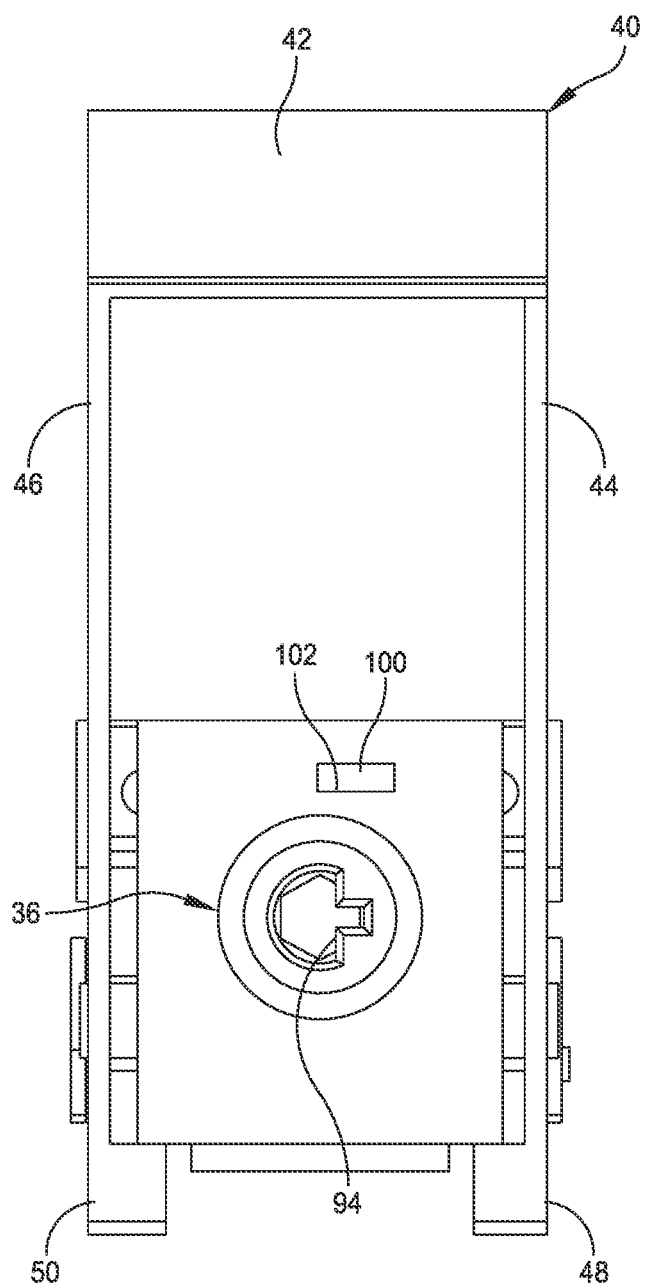
Figure 22:
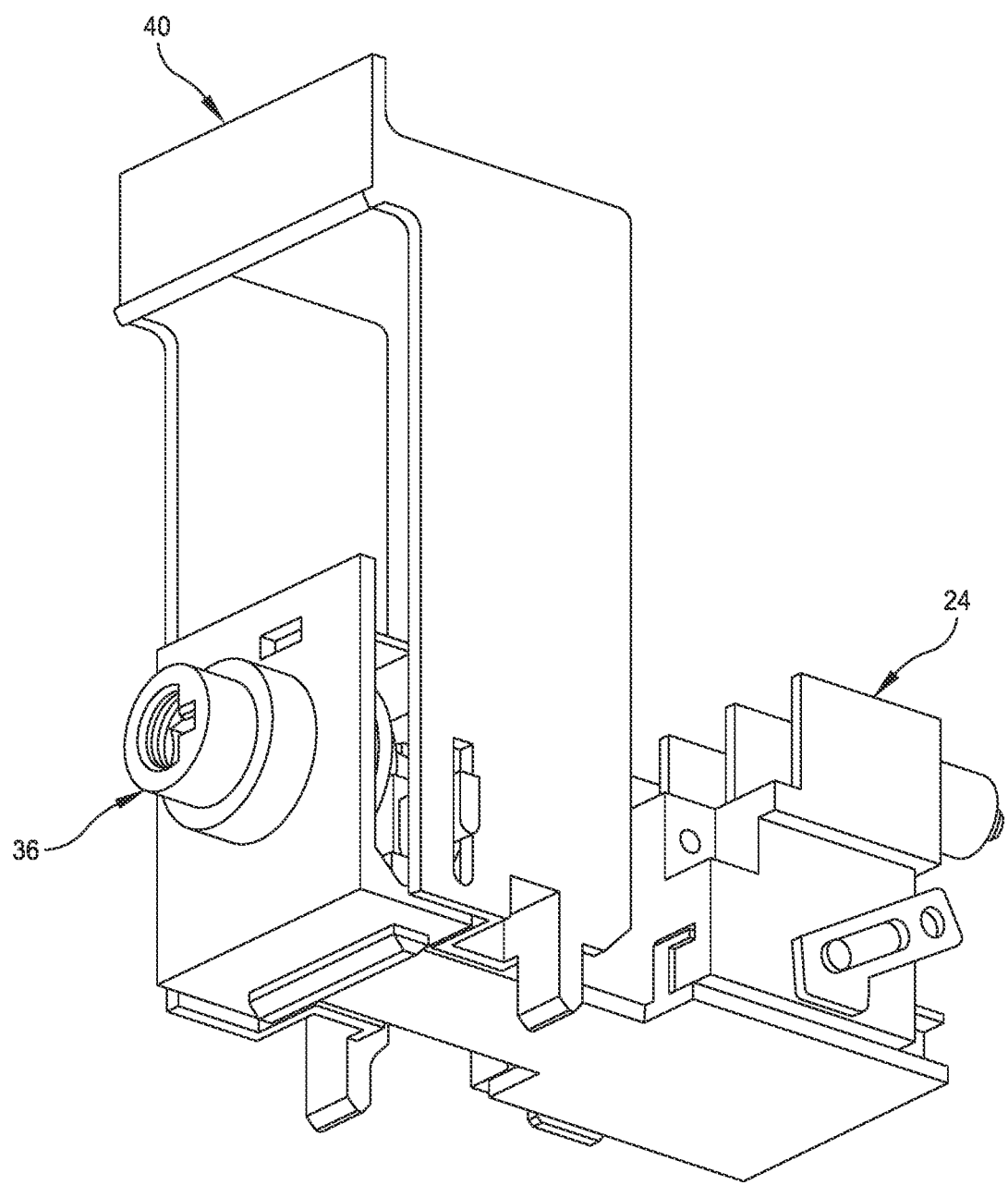
Figure 23:
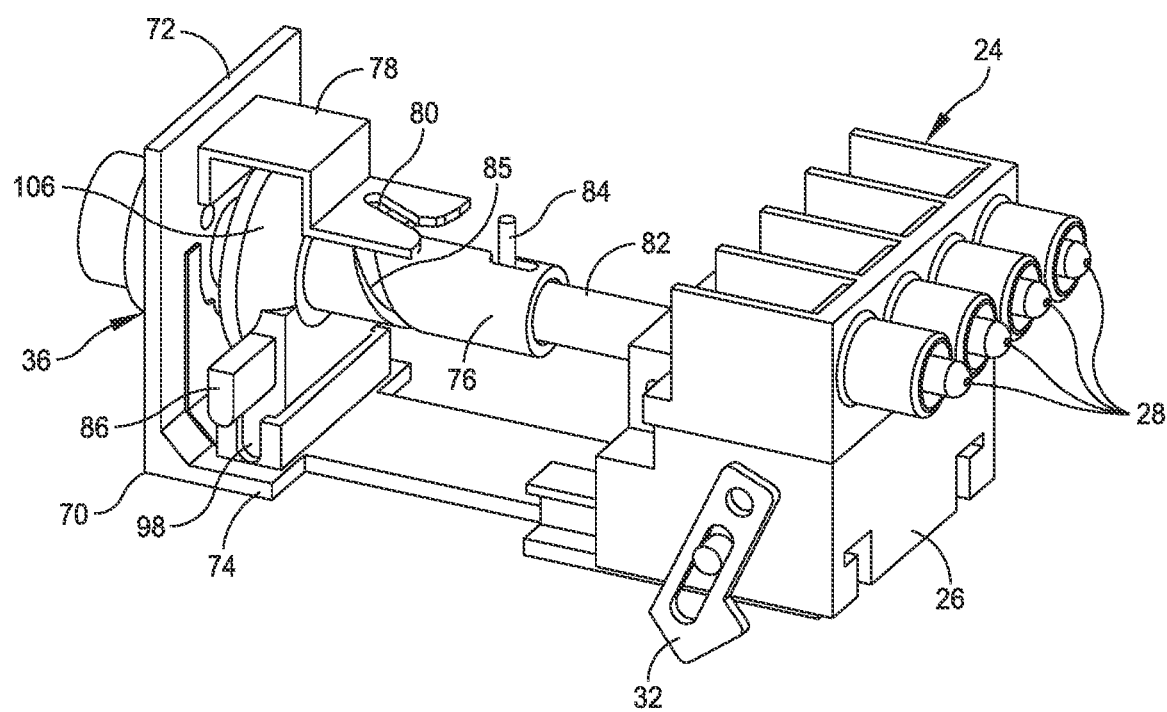
Figure 24:
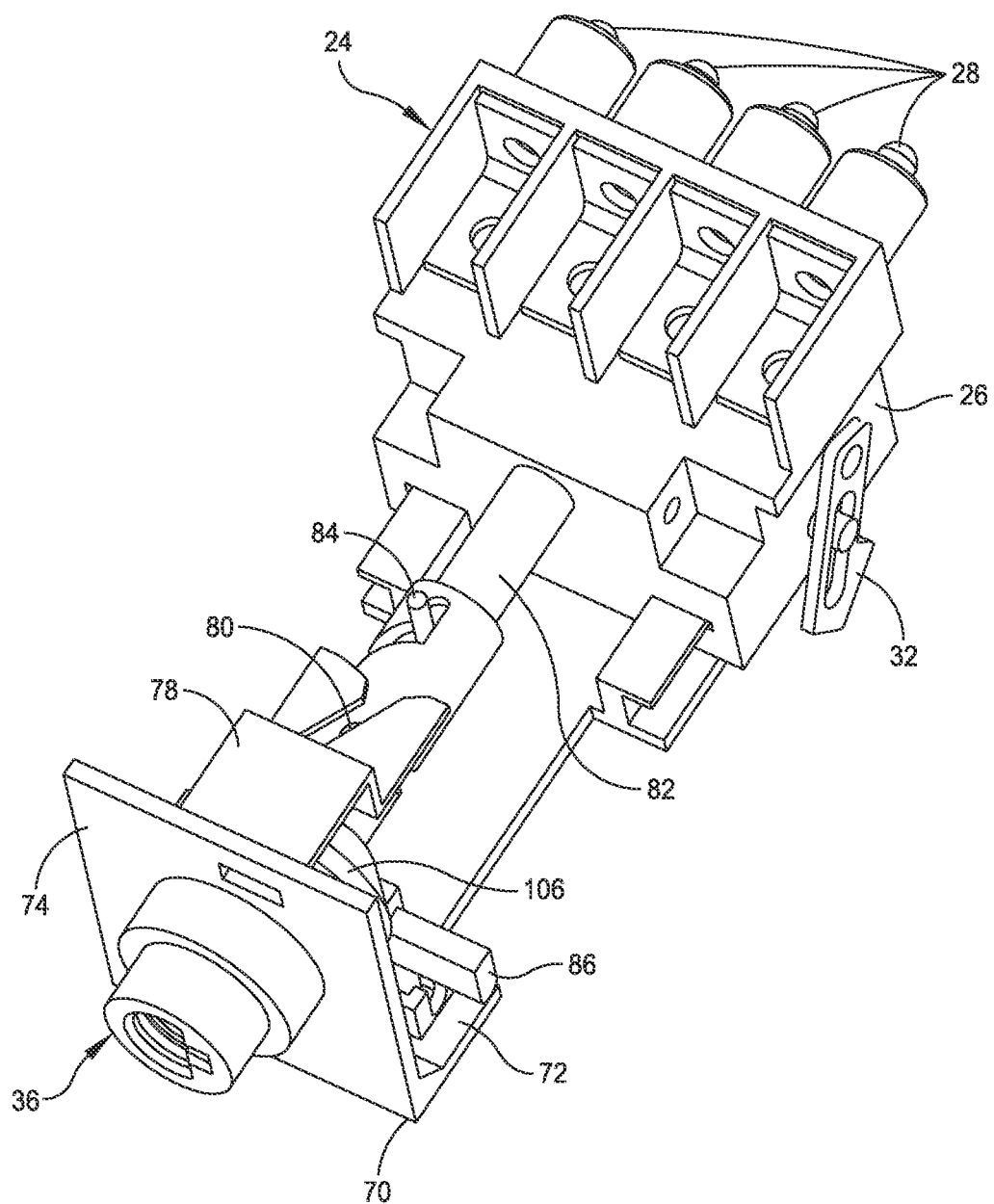

Referring to FIG. 19, when "racking in" a power distribution module with the backplane connector 24 extended, the levers 32 prevent the power distribution module from being inserted. As shown, the levers 32 engage the front of the rail 30 to prevent the backplane connector 24 from being inserted onto the rail 30. Therefore, if the backplane connector 24 is not retracted the levers 32 prevent the insertion of the backplane connector.

Referring to FIGS. 20-24, once the power distribution module is mounted on the rail 30, the tool 96 is inserted into the open end of the cylinder barrel 76 of the locking assembly, and upon rotating the cylindrical barrel with the tool in a clockwise direction, the pin 84 extends to move the backplane connector 24. As described above, to disengage the backplane connector 24, the tool 96 is rotated counterclockwise thus rotating the cylindrical barrel 76 in a counterclockwise direction to retract the pin 84 to enable the backplane connector to move to the disengaged position. Meanwhile, the locking bars 86, 90 are extended through the respective slots 88, 92 of the guard 40 to enable the guard to move upwardly when in the engaged or operating condition.

The power distribution module can be used or provided at the top of the rack enclosure, at the UPS power modules, and/or as an overhead flexible distribution.

Figure 26:
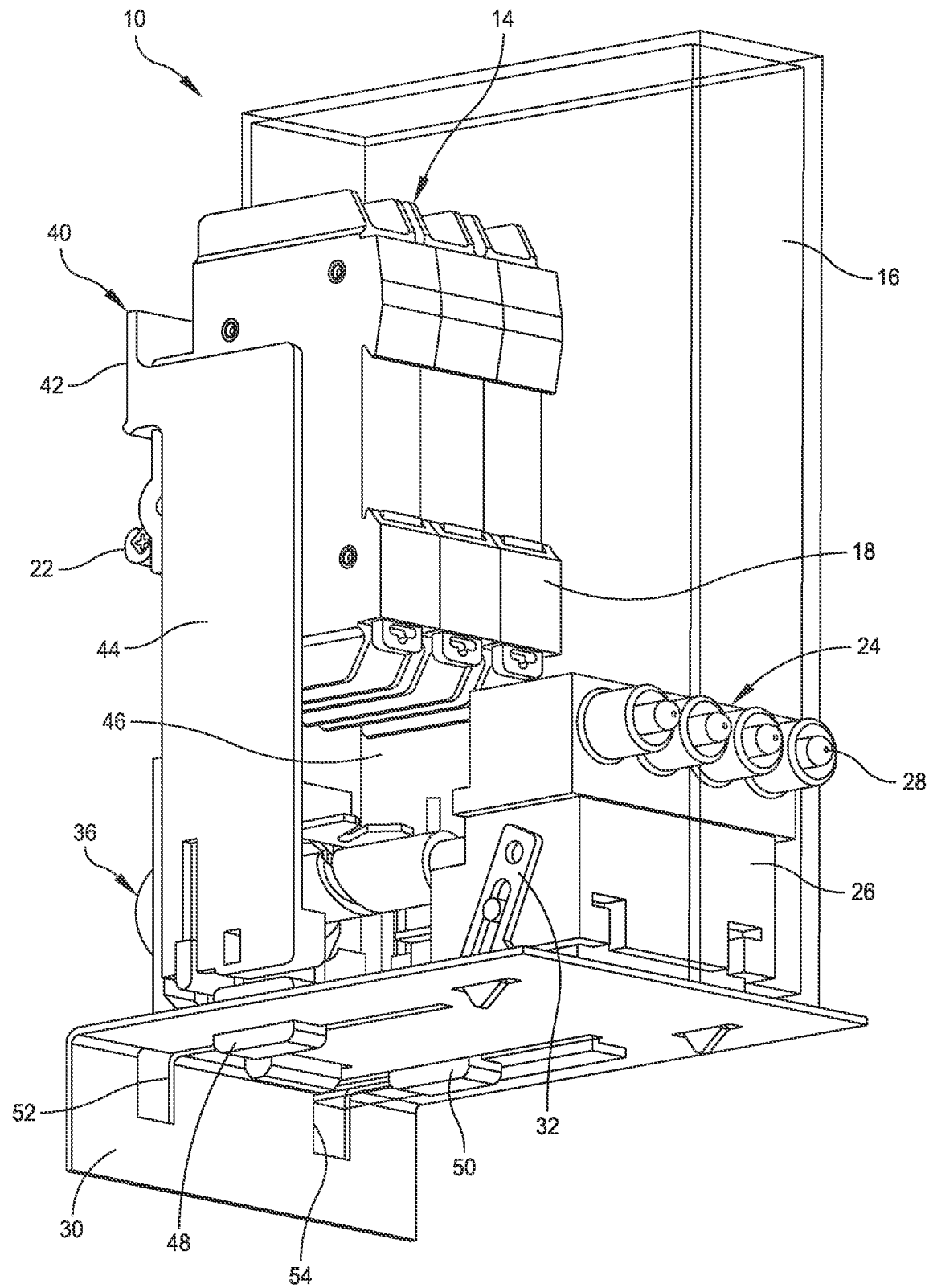
FIGS. 26-28 are views showing the locking assembly of the power distribution system.

Referring to FIG. 26, the spring 64 can be provided to bias the guard 40 upwardly, when the first and second features 48, 50 are aligned to travel through their respective enlarged openings 56, 58 of the rail 30.

Figure 27:
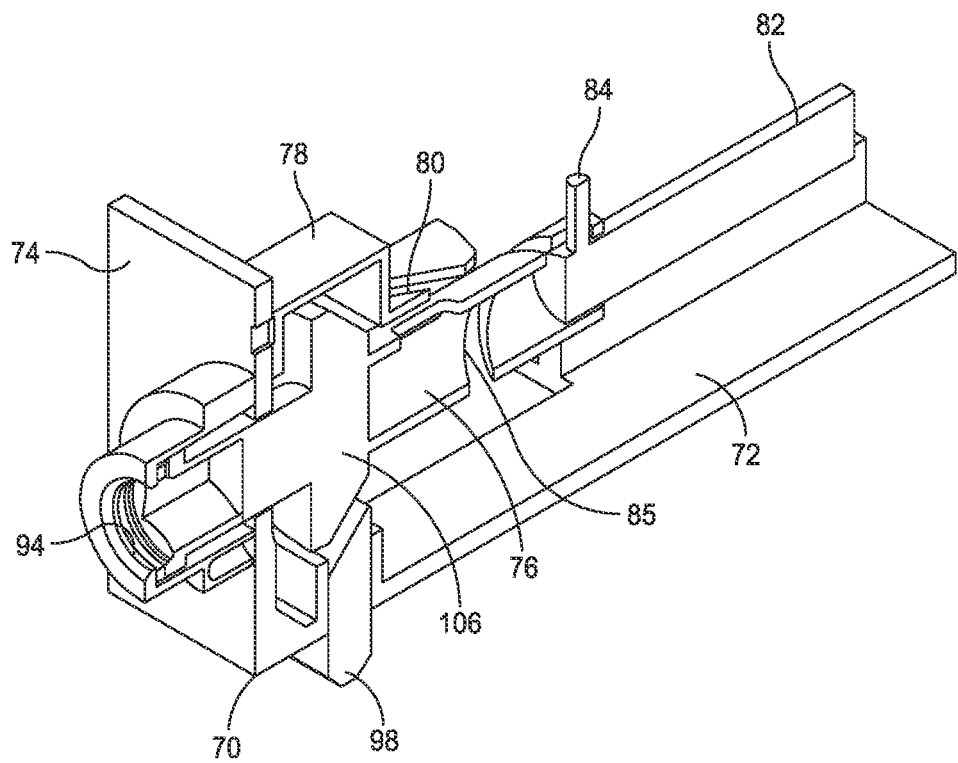
Figure 28:
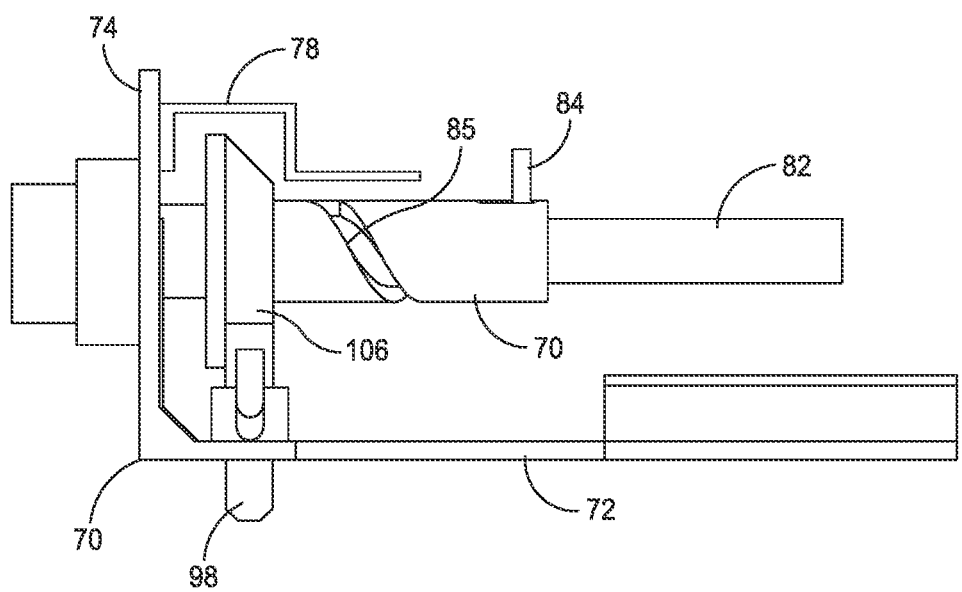

The locking assembly of the interconnect mechanism 36 can further include a spring 104 (FIG. 25) to bias a portion 106 of the cylindrical barrel 76 toward an open end of the cylindrical barrel. With additional reference to FIGS. 27 and 28, the portion 106 is positioned to engage the mechanical tab 78 when the locking assembly is rotated by the tool 96 clockwise thus moving or extending the portion against the bias of the spring 104 to engage the mechanical tab and to force the mechanical tab downwardly so that it extends through the opening of the rail 30. This configuration holds the interconnect mechanism 36 and thus the power distribution module in place on the rail 30.

Figure 29:
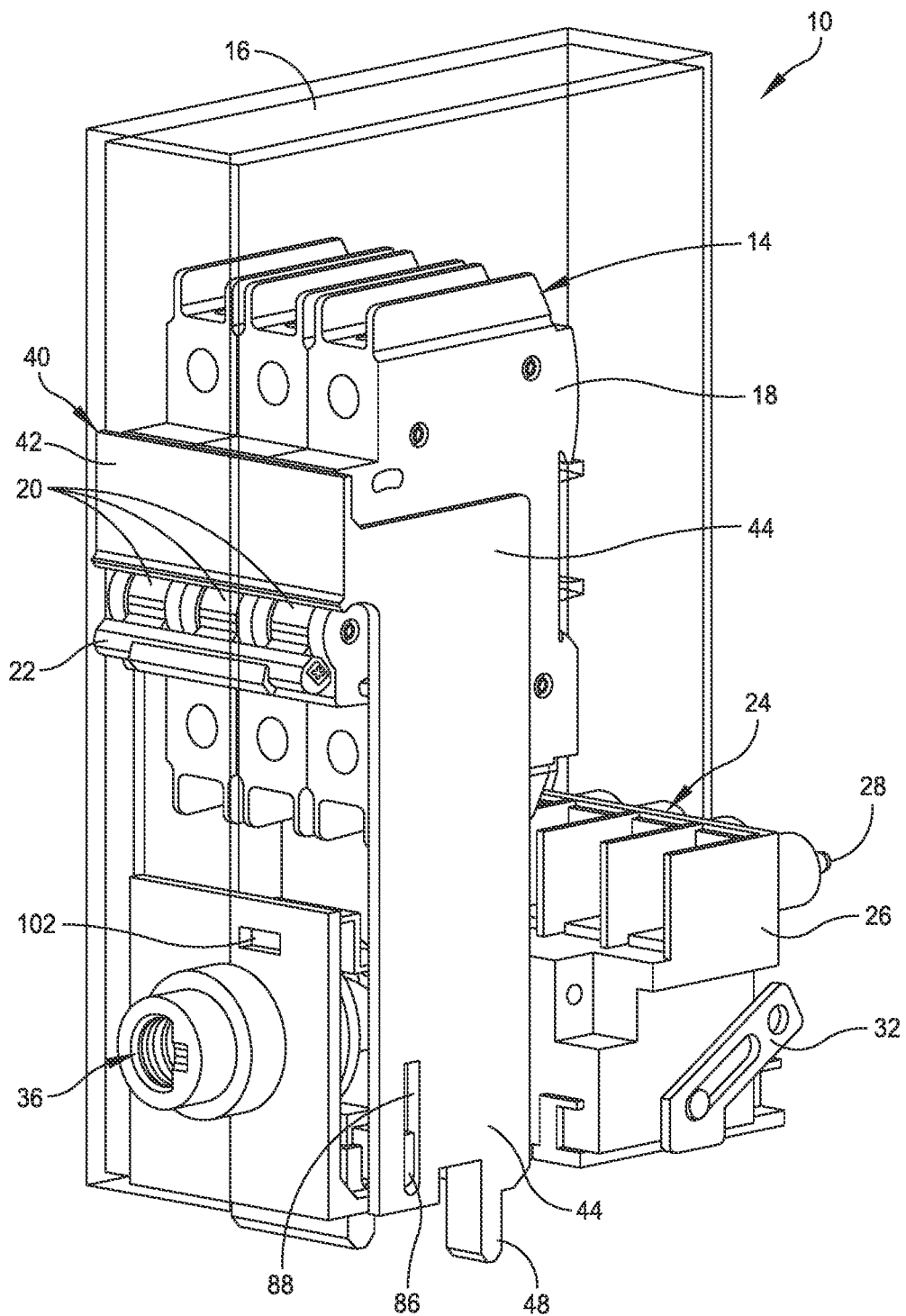
FIGS. 29-31 are perspective views of the power distribution system showing a racking procedure of the power distribution module.
Figure 30:
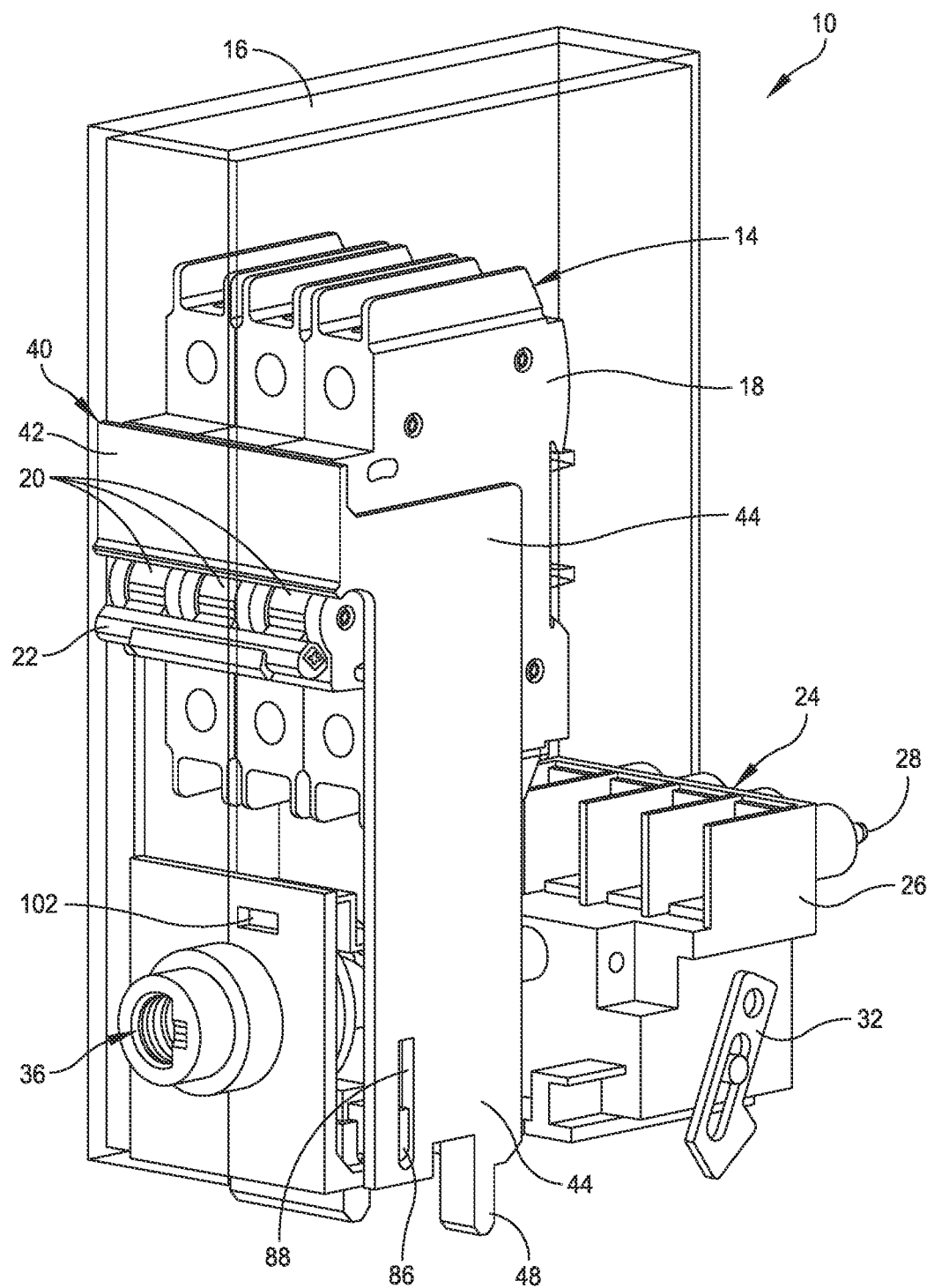
Figure 31:
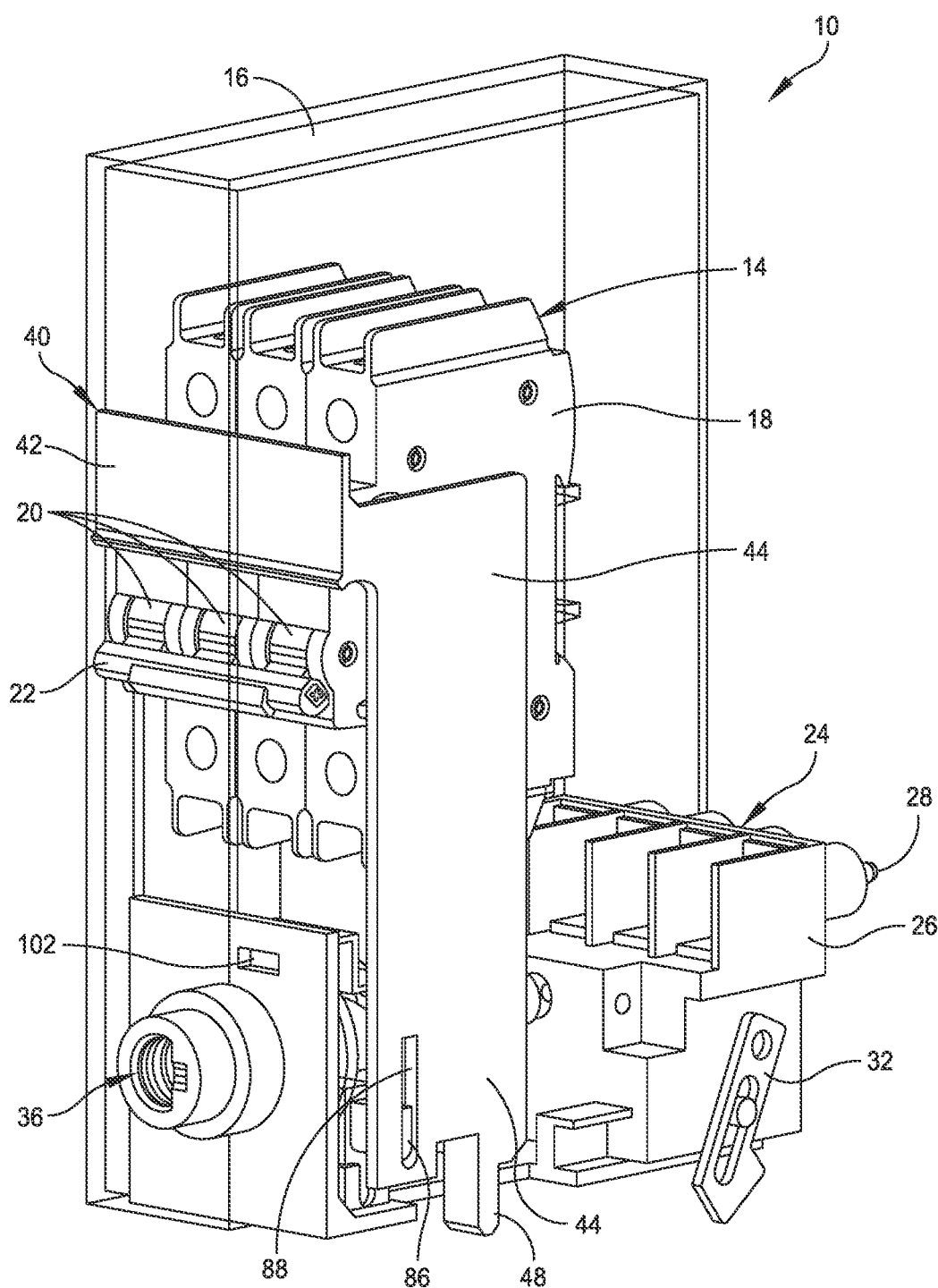

Referring to FIGS. 29-31 a sequence of racking of the power distribution module is illustrated without the rail.

It is to be appreciated that examples of the methods, systems, and apparatuses discussed herein are not limited in application to the details of construction and the arrangement of components set forth in the following description or illustrated in the accompanying drawings. The methods, systems, and apparatuses are capable of implementation in other examples and of being practiced or of being carried out in various ways. Examples of specific implementations are provided herein for illustrative purposes only and are not intended to be limiting. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For example, the power distribution system of embodiments of the present disclosure can be configured with one, two or all of the locking features described herein. In one example, the power distribution system can be configured without the guard 40, with the interconnect mechanism 36 having the locking assembly coupled to the backplane connector 24. In another example, the power distribution system can be configured without the interconnect mechanism 36 and/or the guard 40, with the backplane connector 24 having an adjustable connector assembly, e.g., lever spring 32, configured to adjust a backplane connector.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A power distribution system configured to be releasably secured to a power distribution panel, the power distribution system comprising:
    a circuit breaker including an enclosure configured to support at least one circuit breaker switch movable between an ON position and an OFF position, the circuit breaker being configured to detect a fault condition in which the circuit breaker further is configured to automatically move the at least one circuit breaker switch from the ON position to the OFF position;
    a backplane connector configured to provide connection to the power distribution panel;
    an interconnect mechanism configured to connect the circuit breaker to the backplane connector when the circuit breaker is moved from a disengaged position to an engaged position with respect to the backplane connector; and
    a guard coupled to the interconnect mechanism and configured to cover portions of the enclosure of the circuit breaker, the guard further being configured to move between a first position and a second position, the first position being before the interconnect mechanism connects the circuit breaker to the backplane connector and the second position being after the interconnect mechanism connects the circuit breaker to the backplane connector, the guard being biased toward the second position,
    wherein when the guard is in the first position, a position of the guard prevents the at least one circuit breaker switch from moving from the OFF position to the ON position, and when the guard is in the second position, the position of the guard enables movement of the at least one circuit breaker switch to move from the OFF position to the ON position.

2. The power distribution system of claim 1, wherein the guard includes at least one feature configured to retain the guard in the first position to prevent movement of the circuit breaker to the ON position and to permit movement of the guard to the second position to enable movement of the circuit breaker from the OFF position to the ON position.

3. The power distribution system of claim 2, wherein the at least one feature engages a rail to retain the guard in the first position when the circuit breaker is in the disengaged position with respect to the backplane connector to prohibit movement of the at least one circuit breaker switch to the ON position and disengages the rail when the circuit breaker is in the engaged position with respect to the backplane connector to permit the guard to move to the second position to enable movement of the at least one circuit breaker switch to the ON position.

4. The power distribution system of claim 3, further comprising a spring to bias the guard to the second position.

5. The power distribution system of claim 2, wherein the guard includes a front panel and at least one side element terminating in the at least one feature, the front panel being configured to prevent the at least one circuit breaker switch from moving from the OFF position to the ON position.

6. The power distribution system of claim 5, wherein the at least one side element further includes a first side element extending from the front panel along a first side of the enclosure of the circuit breaker and a second side element extending from the front panel along a second side of the enclosure of the circuit breaker.

7. The power distribution system of claim 6, wherein the at least one feature further includes a first feature provided at an end of the first side element and a second feature provided at an end of the second side element.

8. The power distribution system of claim 1, wherein the interconnect mechanism includes a locking assembly coupled to the guard.

9. The power distribution system of claim 8, wherein the locking assembly is configured to secure the circuit breaker in the engaged position.

10. The power distribution system of claim 9, wherein the locking assembly includes a cylindrical barrel having a slot formed therein and a piston having a pin, the piston being received in the cylindrical barrel with the pin being received in the slot, the pin being configured to move from a retracted position to an extended position by rotating the cylindrical barrel.

11. The power distribution system of claim 10, wherein the cylindrical barrel includes a tool slot configured to receive a tool to rotate the cylindrical barrel.

12. The power distribution system of claim 11, wherein the tool slot has a unique shape and the tool has a mating unique shape configured to be received by the tool slot.

13. The power distribution system of claim 2, wherein the backplane connector includes an adjustable connector assembly configured to adjust the backplane connector.

14. The power distribution system of claim 13, wherein the adjustable connector assembly includes a lever biased to engage an opening in a rail to maintain the backplane connector in a use position.

15. A method of assembling a power distribution system, the method comprising:
    positioning a backplane connector on a rail of a power distribution panel, the backplane connector being configured to provide connection to the power distribution panel;
    coupling a circuit breaker to the backplane connector by an interconnect mechanism, the circuit breaker including an enclosure configured to support at least one circuit breaker switch movable between an ON position and an OFF position, the circuit breaker being configured to detect a fault condition in which the circuit breaker further is configured to automatically move the at least one circuit breaker switch from the ON position to the OFF position, the interconnect mechanism being configured to connect the circuit breaker to the backplane connector when the circuit breaker is moved from a disengaged position to an engaged position with respect to the backplane connector; and
    coupling a guard to the interconnect mechanism, the guard being configured to cover portions of the enclosure of the circuit breaker, the guard further being configured to move between a first position and a second position, the first position being before the interconnect mechanism connects the circuit breaker to the backplane connector and the second position being after the interconnect mechanism connects the circuit breaker to the backplane connector, the guard being biased toward the second position, wherein when the guard is in the first position, a position of the guard prevents the at least one circuit breaker switch from moving from the OFF position to the ON position, and when the guard is in the second position, the position of the guard enables movement of the at least one circuit breaker switch to move from the OFF position to the ON position.

16. The method of claim 15, further comprising retaining the guard in the first position to prevent movement of the circuit breaker to the ON position and to permit movement of the guard to the second position to enable movement of the circuit breaker from the OFF position to the ON position.

17. The method of claim 16, wherein the guard includes at least one feature to retain the guard in a first position and to permit movement of the guard to a second position.

18. The method of claim 17, wherein in which the at least one feature engages the rail to retain the guard in the first position when the circuit breaker is in the disengaged position with respect to the backplane connector to prohibit movement of the at least one circuit breaker switch to the ON position and disengages the rail when the circuit breaker is in the engaged position with respect to the backplane connector to permit the guard to move to the second position to enable movement of the at least one circuit breaker switch to the ON position.

19. The method of claim 17, wherein the guard includes a front panel and at least one side element terminating in the at least one feature, the front panel being configured to prevent the at least one circuit breaker switch from moving from the OFF position to the ON position.

20. The method of claim 19, wherein the at least one side element further includes a first side element extending from the front panel along a first side of the enclosure of the circuit breaker and a second side element extending from the front panel along a second side of the enclosure of the circuit breaker.

21. The method of claim 20, wherein the at least one feature further includes a first feature provided at an end of the first side element and a second feature provided at an end of the second side element.

22. The method of claim 17, further comprising biasing the guard to the second position.

23. The method of claim 22, wherein the guard is biased to the second position by a spring.

24. The method of claim 16, wherein the backplane connector includes an adjustable connector assembly configured to adjust the backplane connector.

25. The method of claim 24, wherein the adjustable connector assembly includes a lever biased to engage an opening in the rail to maintain the backplane connector in a use position.

26. The method of claim 15, wherein coupling the circuit breaker to the backplane connector by the interconnect mechanism includes coupling a locking assembly to the guard.

27. The method of claim 26, wherein the locking assembly is configured to secure the circuit breaker in the engaged position.

28. The method of claim 27, wherein the locking assembly includes a cylindrical barrel having a slot formed therein and a piston having a pin, the piston being received in the cylindrical barrel with the pin being received in the slot, the pin being configured to move from a retracted position to an extended position by rotating the cylindrical barrel.

29. The method of claim 28, wherein the cylindrical barrel includes a tool slot configured to receive a tool to rotate the cylindrical barrel.

30. The method of claim 29, wherein the tool slot has a unique shape and the tool has a mating unique shape configured to be received by the tool slot.

* * * * *